US008329832B2

(12) United States Patent
Horiuchi et al.

(10) Patent No.: US 8,329,832 B2
(45) Date of Patent: Dec. 11, 2012

(54) PROCESS FOR PRODUCING CYCLIC POLYARYLENE SULFIDE

(75) Inventors: Shunsuke Horiuchi, Nagoya (JP); Kohei Yamashita, Nagoya (JP); Kayo Tsuchiya, Nagoya (JP); Koji Yamauchi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 344 days.

(21) Appl. No.: 12/528,924

(22) PCT Filed: Feb. 27, 2008

(86) PCT No.: PCT/JP2008/053357
§ 371 (c)(1),
(2), (4) Date: Aug. 27, 2009

(87) PCT Pub. No.: WO2008/105438
PCT Pub. Date: Sep. 4, 2008

(65) Prior Publication Data
US 2010/0137531 A1    Jun. 3, 2010

(30) Foreign Application Priority Data

Feb. 28, 2007 (JP) ................... 2007-049379
Jul. 10, 2007 (JP) ................... 2007-181518

(51) Int. Cl.
*C08F 75/00* (2006.01)
(52) U.S. Cl. ........ 525/537; 525/535; 528/373; 528/388; 528/488; 528/489; 528/499; 528/389
(58) Field of Classification Search ............ 525/537, 525/535; 528/373, 388, 488, 489, 499, 389
See application file for complete search history.

(56) References Cited

U.S. PATENT DOCUMENTS 5,384,391 A * 1/1995 Miyata et al. .............. 528/377
5,869,599 A   2/1999 Hay et al.

FOREIGN PATENT DOCUMENTS

| JP | 45-003368 B | 11/1963 |
| JP | 52-012240 B | 11/1973 |
| JP | 63-3375 | 8/1981 |
| JP | 62-232437 A | 10/1987 |
| JP | 02-140233 | 5/1990 |
| JP | 04-007334 | 1/1992 |
| JP | 04-213329 | 8/1992 |
| JP | 04-311725 | 11/1992 |
| JP | 05-043689 | 2/1993 |
| JP | 05-098007 | 4/1993 |
| JP | 5-163349 A | 6/1993 |
| JP | 11-012359 A | 1/1999 |
| JP | 2007-231255 A | 9/2007 |
| WO | WO 2007/034800 A1 | 3/2007 |

OTHER PUBLICATIONS

Bull Acad. Sci., vol. 39, pp. 763-766, 1990, Sergeev et al.
International Search Report dated Jun. 3, 2008, application No. PCT/JP2008/053357.

* cited by examiner

*Primary Examiner* — Shane Fang
(74) *Attorney, Agent, or Firm* — RatnerPrestia

(57) ABSTRACT

A method for producing a cyclic polyarylene sulfide, wherein a cyclic polyarylene sulfide is produced by heating a reaction mixture which is composed of at least a linear polyarylene sulfide (a), a sulfidizing agent (b), a dihalogenated aromatic compound (c) and an organic polar solvent (d). This method for producing a cyclic polyarylene sulfide is characterized in that not less than 1.25 liters of the organic polar solvent is used per 1 mole of the sulfur content in the reaction mixture. This method enables to efficiently produce a cyclic polyarylene sulfide, more specifically cyclic oligoarylene sulfide by an economical and simple process in short time.

9 Claims, No Drawings

PROCESS FOR PRODUCING CYCLIC POLYARYLENE SULFIDE

This application is a U.S. National Phase Application of PCT International Application No. PCT/JP2008/053357, filed Feb. 27, 2008, which claims priority to Japanese Patent Application No. 2007-049379, filed Feb. 28, 2007, and Japanese Patent Application No. 2007-181518, filed Jul. 10, 2007, the contents of all applications being incorporated by reference herein in their entirety.

FIELD OF THE INVENTION

The invention relates to a process for producing a cyclic polyarylene sulfide. More specifically, it relates to a process for producing a cyclic oligo(polyarylene sulfide).

BACKGROUND OF THE INVENTION

In recent years, attention is focused on aromatic cyclic compounds because of their potential as high-function or functional material owing to characteristics originating in their cyclic structures, i.e., their unique features based on their structures to serve as compounds with clathration capability or as useful monomers that undergo ring opening polymerization to synthesize a high molecular weight, straight-chain polymer. The cyclic polyarylene sulfide (hereinafter, polyarylene sulfide will be occasionally abbreviated as PAS) falls in the category of aromatic cyclic compounds, and deserves such attention as described above.

A process proposed for production of a cyclic polyarylene sulfide is to perform oxidation polymerization of, for instance, a diaryl disulfide compound under ultradilute conditions (for instance, see Patent document 1). It is expected that this process produces a cyclic polyarylene sulfide highly selectively, without significant formation of linear polyarylene sulfides, making it possible to obtain a cyclic polyarylene sulfide with a high yield. However, this process essentially requires reaction under ultradilute conditions, and can produce a very small amount of cyclic polyarylene sulfide per unit volume of the reaction container used, and therefore, the process is problematic in view of efficient production of a cyclic polyarylene sulfide. Said process, furthermore, uses oxidation polymerization and essentially requires mild conditions around room temperature. Thus, the reaction has to be performed for a lengthy period of time, say, several tens of hours, and is inferior in terms of productivity. Polyarylene sulfides resulting as by-products from said process are low molecular weight ones containing disulfide bonds originating in the diaryl disulfide fed as starting material. They have a molecular weight close to that of the target cyclic polyarylene sulfide, making it difficult to separate the cyclic polyarylene sulfide from by-product polyarylene sulfides. Thus, it is very difficult to produce a high-purity cyclic polyarylene sulfide efficiently. For said process, furthermore, an expensive oxidation agent such as dichlorodicyanobenzoquinone is as necessary as the feed diaryl disulfide to advance the oxidation polymerization, preventing the production of a cyclic polyarylene sulfide at low cost. Another process that has been proposed uses oxygen as oxidation agent while carrying out oxidation polymerization under the existence of a metal catalyst. Though the oxidation agent for this process is available at low price, the control of the reaction is difficult and a wide variety of by-product oligomers will be formed in large amounts. There are other problems such as the need of a length period of time for the reaction. In any case, it is impossible to produce a high-purity cyclic polyarylene sulfide efficiently at low cost.

Another cyclic polyarylene sulfide production process that has been disclosed uses the copper salt of 4-bromothiophenol which is heated in quinoline under ultradilute conditions. As in the case of Patent document 1, this process also essentially requires ultradilute conditions, and the reaction requires a lengthy period of time. The productivity of the process, however, is very low. It is also difficult to separate the by-product copper bromide from the target cyclic polyarylene sulfide, and the cyclic polyarylene sulfide has a low purity (for instance, see Patent document 2).

To produce a cyclic polyarylene sulfide at a high yield, a process that has been disclosed allows a dihalogen aromatic compound, such as 1,4-bis-(4'-bromophenyl thio)benzene, to come in contact with a sodium sulfide in N-methylpyrrolidone at a reflux temperature (for instance, see Nonpatent document 1). This process uses 1.25 liters or more of an organic polar solvent for 1 mole of a sulfur component in the reaction mixture, suggesting that a cyclic polyarylene sulfide will be produced. However, since linear polyarylene sulfide is not used as feed material, it is necessary to feed a dihalogen aromatic compound in large amounts. A very special type of dihalogen aromatic compound is needed, furthermore, and the industrial practicability of the process is very low, requiring efforts to improve it.

To produce a cyclic polyarylene sulfide from common feed materials, a process has been disclosed which allows p-dichlorobenzene, i.e., a dihalogenated aromatic compound, and sodium sulfide, i.e., an alkali metal sulfide, to react in N-methyl pyrrolidone, i.e., an organic polar solvent, followed by removing the solvent while heating under reduced pressure and washing the product. The resulting polyphenylene sulfide is subjected to extraction with methylene chloride and the target substance is recovered from the saturated solution portion of the extract obtained (for instance, see Patent document 3). The problem with this process is that the major portion of the product is accounted for by high molecular weight polyphenylene sulfide, and the cyclic polyarylene sulfide can be obtained in very small amounts (at a yield of less than 1%).

Also disclosed are polyarylene sulfide production processes in which an aromatic compound or thiophene containing at least one nuclear-substituted halogen atom is reacted with an alkali metal monosulfide in a polar organic solvent at a raised temperature (for instance, see Patent document 4, Patent document 5 and Patent document 6). Unlike the purpose of the invention, these processes aims to provide polyarylene sulfides and the documents contain nothing concerning the production of cyclic polyarylene sulfides. These processes, which aim to produce polyarylene sulfides with high molecular weights, use smaller amounts of organic polar solvents relative to the amounts of sulfidizing agents and the documents not only disclose nothing about reactions that involve 1.25 liters or more of an organic polar solvent per mole of the sulfur atoms in the sulfidizing agent used, but also describe clearly that a useful product cannot be obtained if more than one liter of a organic polar solvent is used per mole of the sulfur atoms in the sulfidizing agent. Furthermore, they describe nothing about the use of a linear polyarylene sulfide as feed material.

To produce an arylene sulfide based polymer by using a linear polyarylene sulfide as feed material, a process has been disclosed in which a polyarylene sulfide is reacted with an alkali metal sulfide to cause depolymerization and the resulting prepolymer with an alkali thiolate group at least at one end is reacted with a dihalogenated aromatic compound to cause polymerization (for instance, see Patent document 7). This process, which relates to the modification of a polyarylene sulfide, not only is designed for a purpose different from that of the present invention, but also the document describes nothing about the production of a cyclic polyarylene sulfide. Furthermore, since this process aims to produce a high molecular weight polyarylene sulfide, the document only discloses a reaction that involves about 1 kg or less of an organic polar solvent per mole of the sulfur components in the reaction mixture and describes nothing about a reaction that involves 1.25 liters or more of an organic polar solvent per mole of the sulfur component in the reaction mixture. This process essentially requires a two-step reaction in which a polyarylene sulfide is reacted with an alkali metal sulfide to prepare a prepolymer with an alkali thiolate group at at least one end, followed by polymerizing this prepolymer and a dihalogenated aromatic compound. As compared with embodiments of the invention in which a linear polyarylene sulfide, a sulfidizing agent and a dihalogenated aromatic compound are reacted together, the above-mentioned has many problems including the necessity of accurate reaction control and difficult operations.

There are other disclosed processes in which a polyarylene sulfide used as feed material is reacted with an alkali metal sulfide. In one of them, a thiolate group is introduced to an end of a polyphenylene sulfide to produce a highly reactive polyphenylene sulfide (for instance, see Patent document 8) while in others, a polyarylene sulfide is reacted with an alkali metal sulfide to synthesize a prepolymer with an alkali thiolate group at least one end, followed by reaction with various dihalogenated aromatic compounds to produce polyarylene sulfide based copolymers (for instance, see Patent documents 9 to 12). These processes, however, have purposes different from that of embodiments of the present invention, and the documents not only describes nothing about cyclic polyarylene sulfides, i.e., the target of embodiments of the invention, but also describes nothing about a reaction that involves 1.25 liters or more of an organic polar solvent per mole of the sulfur component in the reaction mixture.

[Patent document 1] Japanese Patent Registration No. 3200027 (Claims)
[Patent document 2] U.S. Pat. No. 5,869,599 (p. 14)
[Patent document 3] Japanese Unexamined Patent Publication (Kokai) No. Hei 05-163349 (p. 7)
[Patent document 4] Japanese Examined Patent Publication (Kokoku) No. Sho 45-3368 (p. 6 to 8)
[Patent document 5] Japanese Examined Patent Publication (Kokoku) No. Sho 52-12240 (p. 10 to 20)
[Patent document 6] Japanese Examined Patent Publication (Kokoku) No. Sho 63-3375 (p. 6-9)
[Patent document 7] Japanese Unexamined Patent Publication (Kokai) No. Hei 04-7334 (Claims)
[Patent document 8] Japanese Unexamined Patent Publication (Kokai) No. Hei 02-140233 (Claims)
[Patent document 9] Japanese Unexamined Patent Publication (Kokai) No. Hei 04-213329 (Claims)
[Patent document 10] Japanese Unexamined Patent Publication (Kokai) No. Hei 04-311725 (Claims)
[Patent document 11] Japanese Unexamined Patent Publication (Kokai) No. Hei 05-043689 (Claims)
[Patent document 12] Japanese Unexamined Patent Publication (Kokai) No. Hei 05-98007 (Claims)
[Nonpatent document 1] Bull. Acad. Sci., vol. 39, p. 763-766, 1990

SUMMARY OF THE INVENTION

The invention provides a process for producing a cyclic polyarylene sulfide economically, quickly, simply and efficiently.

The invention provides the following processes.

Process 1

A process for producing a cyclic polyarylene sulfide comprising the heating of a reaction mixture containing at least
(a) a linear polyarylene sulfide,
(b) a sulfidizing agent,
(c) a dihalogenated aromatic compound, and
(d) an organic polar solvent,
to cause reaction to produce a cyclic polyarylene sulfide wherein the amount of the organic polar solvent is 1.25 liters or more per mole of the sulfur component in the reaction mixture.

Process 2

A process for producing a cyclic polyarylene sulfide as claimed in Process 1 wherein the heating temperature is above the reflux temperature of the reaction mixture under atmospheric pressure.

Process 3

A process for producing a cyclic polyarylene sulfide as claimed in either Process 1 or 2 wherein the amount of the organic polar solvent used is 50 liters or less per mole of the sulfur component in the reaction mixture.

Process 4

A process for producing a cyclic polyarylene sulfide as claimed in any of Processes 1 to 3 wherein the pressure applied during the heating of the reaction mixture is 0.05 MPa or more in terms of gauge pressure.

Process 5

A process for producing a cyclic polyarylene sulfide as claimed in any of Processes 1 to 4 wherein the dihalogenated aromatic compound (c) is dichlorobenzene.

Process 6

A process for producing a cyclic polyarylene sulfide as claimed in any of Processes 1 to 5 wherein the sulfidizing agent (b) is an alkali metal sulfide.

Process 7

A process for producing a cyclic polyarylene sulfide as claimed in any of Processes 1 to 6 wherein a polyarylene sulfide prepared by allowing a sulfidizing agent to come in contact with a dihalogenated aromatic compound in an organic polar solvent is used as the linear polyarylene sulfide (a).

Process 8

A process for producing a cyclic polyarylene sulfide as claimed in any of Processes 1 to 6 wherein a sulfidizing agent and a dihalogenated aromatic compound is heated in an organic polar solvent whose amount is 1.25 liters or more per mole of the sulfur component of the sulfidizing agent to cause reaction to produce a polyarylene sulfide mixture consisting of a cyclic polyarylene sulfide and a linear polyarylene sulfide, followed by removing the cyclic polyarylene sulfide from the mixture and using the resulting linear polyarylene sulfide as the linear polyarylene sulfide (a).

Process 9

A process for producing a cyclic polyarylene sulfide as claimed in any of Processes 1 to 6 wherein a reaction mixture consisting of at least a linear polyarylene sulfide, a sulfidizing agent, a dihalogenated aromatic compound and an organic polar solvent in which the amount of the organic polar solvent is 1.25 liters or more per mole of the sulfur component in the reaction mixture is heated to cause reaction to produce a polyarylene sulfide mixture consisting of a cyclic polyarylene sulfide and a linear polyarylene sulfide, followed by removing the cyclic polyarylene sulfide from the mixture and using the resulting linear polyarylene sulfide as the linear polyarylene sulfide (a).

Process 10

A process for producing a cyclic polyarylene sulfide as claimed in any of Processes 1 to 9 wherein the weight average molecular weight of the linear polyarylene sulfide (a) is 2,500 or more.

The invention provides a process for producing a cyclic polyarylene sulfide and more specifically, it provides a process for producing a cyclic oligo(polyarylene sulfide) economically, quickly, simply and efficiently.

DETAILED DESCRIPTION OF THE INVENTION

Details of embodiments of the invention are described below.

(1) sulfidizing Agent

Any sulfidizing agent can be used in embodiments of the invention if it can introduce sulfide bonds in a dihalogenated aromatic compound or act on arylene sulfide bonds to form an arylene thiolate, and such substances include, for instance, alkali metal sulfides, alkali metal hydrosulfides, and hydrogen sulfides.

Specifically, useful alkali metal sulfides include, for instance, lithium sulfide, sodium sulfide, potassium sulfide, rubidium sulfide, cesium sulfide, and mixtures of two or more thereof, of which lithium sulfide and/or sodium sulfide are preferable, sodium sulfide being particularly preferable. These alkali metal sulfides may be used in the form of a hydrate, aqueous mixture, or anhydride. An aqueous mixture in this case refers to an aqueous solution, a mixture of an aqueous solution and a solid component, or a mixture of water and a solid component. Common low-priced alkali metal sulfide products are available in the form of a hydrate or aqueous mixture, and therefore, the use of an alkali metal sulfide in such a form is preferable.

Specifically, useful alkali metal hydrosulfides include, for instance, lithium hydrosulfide, sodium hydrosulfide, potassium hydrosulfide, lithium hydrosulfide, rubidium hydrosulfide, cesium hydrosulfide, and mixtures of two or more thereof, of which lithium hydrosulfide and/or sodium hydrosulfide preferable, sodium hydrosulfide being particularly preferable.

In addition, it is possible to use an alkali metal sulfide prepared in situ from a reaction system consisting of an alkali metal hydrosulfide and an alkali metal hydroxide. It is also possible to use an alkali metal sulfide prepared by allowing an alkali metal hydrosulfide and an alkali metal hydroxide to come in contact with each other. Such an alkali metal hydrosulfide and an alkali metal hydroxide may be used in the form of a hydrate, an aqueous mixture, or an anhydride of which a hydrate or an aqueous mixture is preferable in view of required cost.

Furthermore, it is also possible to use an alkali metal sulfide prepared in situ from a reaction system consisting of an alkali metal hydroxide, such as lithium hydroxide and sodium hydroxide, and a hydrogen sulfide. A useful alkali metal sulfide can also be prepared by allowing an alkali metal hydroxide, such as lithium hydroxide and sodium hydroxide, and a hydrogen sulfide to come in contact with each other. Such a hydrogen sulfide may be in the form of gas, liquid, or aqueous solution.

If part of the sulfidizing agent is lost during dehydration operations before the start of the reaction of a linear polyarylene sulfide and a dihalogenated aromatic compound, the amount of the sulfidizing agent in an embodiment of the invention means the remainder of the total feed amount minus said loss.

It is possible to use a sulfidizing agent in combination with an alkali metal hydroxide and/or alkaline earth metal hydroxide. Specifically, preferable alkali metal hydroxides include, for instance, sodium hydroxide, potassium hydroxide, lithium hydroxide, rubidium hydroxide, cesium hydroxide, and mixtures of two or more thereof while preferable alkaline earth metal hydroxides include, for instance, calcium hydroxide, strontium hydroxide, and barium hydroxide, of which sodium hydroxide is particularly preferable.

If an alkali metal hydrosulfide is used as sulfidizing agent, it is particularly preferable to use an alkali metal hydroxide in combination, and its amount in such a case is preferably in the range of 0.95 to 1.50 moles, preferably 1.00 to 1.25 moles, more preferably 1.005 to 1.200 moles, per mole of the alkali metal hydrosulfide. If a hydrogen sulfide is used as sulfidizing agent, it is particularly preferable to use an alkali metal hydroxide in combination, and the amount of the alkali metal hydroxide in such a case is preferably in the range of 2.0 to 3.0 moles, preferably 2.01 to 2.50 moles, more preferably 2.04 to 2.40 moles, per mole of the hydrogen sulfide.

(2) Dihalogenated Aromatic Compound

The useful dihalogenated aromatic compounds to be used for the production of the cyclic PASs of embodiments of the invention include dihalogenated benzenes such as p-dichlorobenzene, o-dichlorobenzene, m-dichlorobenzene, p-dibromobenzene, o-dibromobenzene, m-dibromobenzene, 1-bromo-4-chlorobenzene, and 1-bromo-3-chlorobenzene; and dihalogenated aromatic compounds containing non-halogen substituent groups such as 1-methoxy-2,5-dichlorobenzene, 1-methyl-2,5-dichlorobenzene, 1,4-dimethyl-2, 5-dichlorobenzene, 1,3-dimethyl-2,5-dichlorobenzene, and 3,5-dichlorobenzoic acid. Of these, dihalogenated aromatic compounds comprising a p-dihalogenated benzene, such as p-dichlorobenzene, as the primary component are preferable. Particularly preferable are those in which p-dichlorobenzene accounts for 80 to 100 mol %, more preferably 90 to 100 mol %. It is also possible to use two or more different dihalogenated aromatic compounds in combination for the production of a cyclic PAS copolymer.

The amount of the dihalogenated aromatic compound is preferably in the range of 0.9 to 2.0 moles, more preferably 0.95 to 1.5 moles, still more preferably 0.98 to 1.2 moles, per mole of the sulfur component of the sulfidizing agent.

(3) Linear Polyarylene Sulfide

A linear PAS to be used for embodiments of the invention is a linear homopolymer or a linear copolymer consisting mainly of a repeating unit represented by Formula —(Ar—S)— and said repeating unit should preferably account for 80 mol % or more. The component Ar is a unit as represented by Formulae (A) to (L) described below, of which a unit as represented by Formula (A) is particularly preferable.

[Chemical formula 1]

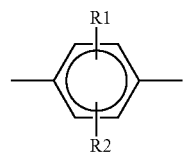

(A)

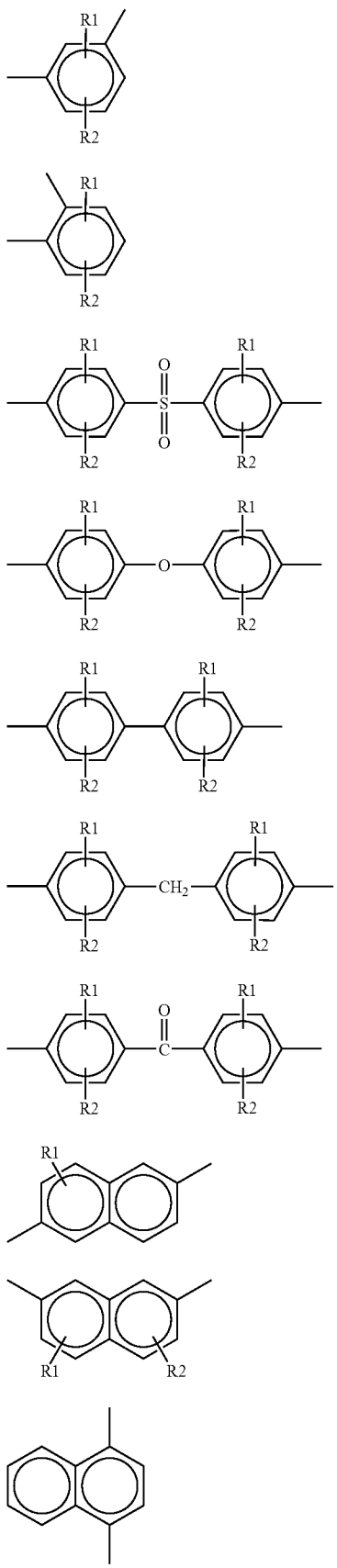

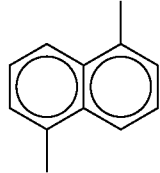

(In the formula, R1 and R2 denote a substituent selected from the group of hydrogen, alkyl group with a carbon number of 1 to 6, alkoxy group with a carbon number of 1 to 6, and halogen group, and R1 and R2 may be either the same or different from each other).

As long as this repeating unit is the major constituent unit, the material may contain a small amount of branch units or crosslinking units as represented by Formulae (M) to (P) given below. The content of these branch units and crosslinking units in the copolymer is preferably in the range of 0 to 1 mol % per mole of the —(Ar—S)— unit.

[Chemical formula 2]

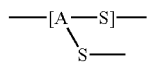

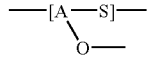

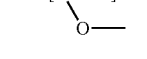

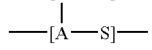

A linear PAS to be used in an embodiment of the invention may be a random copolymer, block copolymer or a mixture thereof that contains a repeating unit as given above.

Typical materials include polyphenylene sulfides, polyphenylene sulfide sulfones, polyphenylene sulfide ketones, random copolymers there of, block copolymers thereof, and mixtures thereof. Particularly preferable PASs include polyphenylene sulfides (hereinafter, occasionally abbreviated PPSs)

[Chemical formula 3]

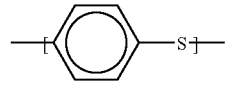

that contain, as the polymer's major constituent unit, a p-phenylene sulfide unit as represented by the following formula up to 80 mol % or more, preferably 90 mol % or more, as well as polyphenylene sulfide sulfones and polyphenylene sulfide ketones.

There are no specific limitations on the melt viscosity of the various linear PASs used in embodiments of the invention, but common linear PASs have a melt viscosity in the range of 0.1 to 1000 Pa·s (300° C., shear velocity 1000/sec), and a preferable range is 0.1 to 500 Pa·s in view of availability. There are also no specific limitations on the molecular weight of these linear PASs, and common PASs can be useful. These PASs typically should have a weight average molecular weight of 1,000 to 1,000,000, preferably 2,500 to 500,000, more preferably 5,000 to 100,000. In general, their solubility to an organic polar solvent weight increases and the required reaction time decreases advantageously with a decreasing average molecular weight. But essentially, they can serve without significant problems if their molecular weights are in the aforementioned range.

There are no specific limitations on the process for producing these linear PASs, and common ones will be useful. For instance, useful production processes include reacting an aromatic compound or thiophene containing at least one nuclear-substituted halogen atom with an alkali metal monosulfide in an organic polar solvent at a raised temperature, and more preferably, allowing a sulfidizing agent to come in contact with a dihalogenated aromatic compound in an organic polar solvent, as described in the aforementioned Patent documents 4 to 6. In addition, a wide variety of other materials such as moldings, molding waste, waste plastics and off-specification products of PASs produced by these processes may also be used.

In general, cyclic compound production processes, including embodiments of the present invention, comprise competitive reactions for the formation a cyclic compound and the formation a linear compound. A process aiming to produce a cyclic PAS will results in the formation of a significant amount of a linear PAS as by-product in addition to the target cyclic PAS. It is possible to use such a by-product linear PAS as feed material without problems. It is particularly preferable to use a linear polyarylene sulfide that is produced by, for instance, heating a sulfidizing agent and a dihalogenated aromatic compound in an organic polar solvent whose amount is 1.25 liters or more per mole of the sulfur component of the sulfidizing agent to cause reaction to produce a polyarylene sulfide mixture consisting of a cyclic polyarylene sulfide and a linear polyarylene sulfide, followed by removing the cyclic polyarylene sulfide from the mixture. It is more preferable to use a linear polyarylene sulfide resulting from carrying out aspects of the invention, i.e., a linear polyarylene sulfide produced by heating a reaction mixture consisting of at least a linear polyarylene sulfide, a sulfidizing agent, a dihalogenated aromatic compound and an organic polar solvent in which the amount of the organic polar solvent is 1.25 liters or more per mole of the sulfur component in the reaction mixture to cause reaction to produce a polyarylene sulfide mixture consisting of a cyclic polyarylene sulfide and a linear polyarylene sulfide, followed by removing the cyclic polyarylene sulfide from the mixture. Conventionally, linear compounds and linear PASs resulting as by-products from the production of a cyclic compound or a cyclic PAS have been discarded as useless waste. Therefore, the production of a cyclic compound will generate large amounts of waste attributed to these by-product linear compounds, and the yield is low as compared with the amount of feed monomers, which is a major problem. Such by-product linear PASs can be used as feed material, which is highly valuable because this can achieve a large reduction of waste and a dramatic improvement in the yield as compared with the amount of feed monomers.

There are no specific limitations on the amount of the linear PAS as long as the reaction mixture contains a linear PAS at the start of the reaction when the degree of conversion of the dihalogenated aromatic compound fed in the reaction system is zero. It is preferable that the amount of the —(Ar—S)— repeating unit, which is the major constituent unit of the linear PAS, accounts for 0.1 to 20 repeating unit moles, more preferably 0.25 to 15 repeating unit moles, and still more preferably 1 to 10 repeating unit moles, per mole of the sulfur component of the sulfidizing agent. If the amount of the linear PAS is in the preferable range, it will be possible to produce a cyclic PAS at a particularly high yield and allow the reaction to proceed quickly.

There are no specific limitations on the structure of the linear PAS, which may be in the form of dry powder, powder-particles, particulates, or pellets, or may contain the organic polar solvent to be used as the reaction solvent. It also may contain a third component that has no significant adverse effect on the reaction. Such third components include, for instance, inorganic fillers, and it is also possible to use a linear PAS in the form of a resin composition containing an inorganic filler.

(4) Organic Polar Solvent

For the production of a cyclic PAS of an embodiment of the invention, an organic polar solvent is used as the reaction solvent, and particularly, it is preferable to use an organic amide solvent. Specifically, in view of the stability of the reaction, preferable ones include N-alkyl pyrrolidones such as N-methyl-2-pyrrolidone, N-ethyl-2-pyrrolidone, and N-cyclohexyl-2-pyrrolidone; caprolactams such as N-methyl-c-caprolactam, and c-caprolactam; aprotic organic solvents such as 1,3-dimethyl-2-imidazolidinone, N,N-dimethyl acetamide, N,N-dimethyl formamide, and hexamethylphosphoric triamide; and mixtures thereof; of which N-methyl-2-pyrrolidone and 1,3-dimethyl-2-imidazolidinone are particularly preferable.

For embodiments of the invention, the amount of the organic polar solvent to be used as the reaction solvent in the production of a cyclic PAS is 1.25 liters or more, preferably 1.5 liters or more, and more preferably 2 liters or more, per mole of the sulfur component in the reaction mixture. The sulfur component in the reaction mixture as referred to herein is defined as the sum of the sulfur component of the feed linear polyarylene sulfide and the sulfur component of the sulfidizing agent. Here, the "number of moles" of the sulfur component of the linear polyarylene sulfide is defined as the number of the repeating units of the polymer, each containing one sulfur atom. For instance, one molecule of a linear polyphenylene sulfide with a polymerization degree of 100 is assumed to be equivalent to 100 moles, instead of 1 mole, when carrying out calculations. The reaction mixture may additionally contain a compound containing a sulfur component as well as a linear polyarylene sulfide and sulfidizing agent, if it has no adverse influence on the essence of the invention. It is not necessary to take into account such a sulfur component in a sulfur-containing compound that virtually has no influence on the reaction performed for embodiments of the invention. Furthermore, there are no specific limitations on the upper limit to the amount of the organic polar solvent. For more efficient production of a cyclic PAS, however, the amount should preferably be 50 liters or less, more preferably 20 liters or less, and still more preferably 15 liters or less, per mole of the sulfur component in the reaction mixture. Herein the amount of a solvent is measured based on the volume of the solvent at room temperature under atmospheric pressure. The selectivity of the formation of a cyclic PAS improves with an increasing amount of the organic polar solvent. If it is too high, however, the formation of the cyclic PAS per unit volume of the reaction container tends to decrease and the reaction will require a longer period of time. The amount of the organic polar solvent should preferably be in said range in order to achieve a high productivity while maintaining a high selectivity for the cyclic PAS formation. Common processes for producing a cyclic compound tend to require a large amount of solvents and would be unable to produce a cyclic compound efficiently in the preferable range. As compared with common processes for cyclic compound production, embodiments of the invention can produce a cyclic PAS efficiently using a relatively small amount of a solvent, i.e., below the upper limit of the aforementioned preferable solvent range. The reason for this is not clearly known at present, but the reaction proceeds very efficiently. It is inferred that the reaction intermediates generated from the reaction of the feed sulfidizing agent and the linear PAS, the reaction of the sulfidizing agent and the dihalogenated aromatic compound and the reaction of the sulfidizing agent and the linear PAS react with the dihalogenated aromatic compound very rapidly to act favorably on the formation of the cyclic compound. Here the amount of the organic polar solvent in the reaction mixture is defined as the remainder of the organic polar solvent introduced in the reaction system minus the organic polar solvent removed out of the reaction system.

(5) Cyclic Polyarylene Sulfide

A cyclic polyarylene sulfide to be used for embodiments of the invention is a cyclic compound comprising a repeating unit as represented by Formula —(Ar—S)— as the major constituent unit. It is as represented by the undermentioned general formula (W) and the repeating unit should preferably account for 80 mol % or more.

[Chemical formula 4]

(Q)

The component Ar is a unit as represented by Formulae (A) to (L) described above, and such a unit should preferably be as represented by Formulae (A) and (C), more preferably by Formulae (A) and (B), and still more preferably by Formula (A).

Here, the cyclic polyarylene sulfide may contain repeating units as represented by said Formulae (A) to (L) to form a random or block copolymer or a mixture of random and block portions. Typical ones include cyclic polyphenylene sulfides, cyclic polyphenylene sulfide sulfones, and cyclic polyphenylene sulfide ketones; cyclic random copolymers and cyclic block copolymers containing the former; and mixtures thereof. Particularly preferable cyclic polyarylene sulfides include cyclic polyphenylene sulfides (hereinafter, occasionally abbreviated cyclic PPSs)

[Chemical formula 5]

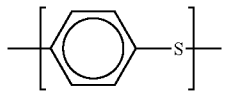

that contain, as the major constituent unit, a p-phenylene sulfide unit as represented by the following formula up to 80 mol % or more, preferably 90 mol % or more.

There are no specific limitations on the number of repetitions, m, in said Formula (Q) for the cyclic polyarylene sulfide, but it should preferably be in the range of 2 to 50, more preferably 2 to 25, and still more preferably 3 to 20. As described later, when a polyarylene sulfide prepolymer containing a cyclic PAS is converted into a high polymer, it is preferable to heat the cyclic polyarylene sulfide above its melting point. The melting point of the cyclic polyarylene sulfide becomes higher as the value of m increases, and therefore, it is advantageous to maintain m in said range because the conversion of a polyarylene sulfide prepolymer into a high polymer can be achieved at a lower temperature.

Said cyclic polyarylene sulfide material may comprise a single compound with a single number of repetitions or a mixture of cyclic polyarylene sulfides with different numbers of repetitions. However, mixtures of cyclic polyarylene sulfides with a different number of repetitions tend to have a lower melting point than single compound with a single number of repetitions. Thus, it is preferable to use a mixture of cyclic polyarylene sulfides with different numbers of repetitions because its conversion into a high polymer can be carried out at a lower temperature.

(6) Process for Producing Cyclic Polyarylene Sulfide

The invention is intended to produce a cyclic polyarylene sulfide by heating a reaction mixture containing at least (a) a linear polyarylene sulfide, (b) a sulfidizing agent, (c) a dihalogenated aromatic compound and (d) an organic polar solvent to cause reaction according to exemplary embodiments.

For the production of a cyclic PAS of an embodiment of the invention, it is preferable to heat a reaction mixture consisting of the aforementioned components above the reflux temperature of the reaction mixture under atmospheric pressure. Atmospheric pressure as referred to here is the pressure in the atmosphere nearly in the standard state and more specifically, it refers to atmospheric pressure conditions at about a temperature of 25° C. under about an absolute pressure of 101 kPa. The reflux temperature here is defined as the temperature of the reaction mixture in which the liquid components are repeatedly going to and fro between boiling and condensing. A reaction mixture can be heated above the reflux temperature under atmospheric pressure by, for instance, allowing the reaction mixture to react under a pressure above atmospheric pressure or heating the reaction mixture in a closed container.

For the production of a cyclic PAS of an embodiment of the invention, it is preferable to carry out the reaction at a temperature at which the feed linear PAS is molten in the reaction mixture. In general, the feed linear PAS is likely to be in the solid state around room temperature and it will be difficult to accelerate the cyclic PAS formation reaction when the material is in the solid state. If the reaction is carried out at a temperature at which the linear PAS is molten, therefore, the reaction system will become uniform and the reaction speed will increase dramatically, allowing the reaction to be completed in a short period of time. Such a temperature cannot be defined uniquely because it changes largely depending on the type and content of the components in the reaction mixture and the structure and molecular weight of the linear PAS used as feed material, but it is commonly in the range of 120 to 350° C., preferably 200 to 320° C., more preferably 230 to 300° C., and still more preferably 240 to 280° C. In this preferable temperature range, it is not only possible for the reaction to proceed uniformly at a higher reaction speed, but also possible to prevent the resulting cyclic PAS from decomposing, leading to efficient production of the cyclic PAS. The reaction may be carried out in one step with a fixed temperature, in multiple steps with stepwise temperatures or by increasing the temperature continuously.

The reaction time also depends in the structure and molecular weight of the feed linear PAS, and the type and feed amount of the sulfidizing agent, dihalogenated aromatic compound and organic polar solvent, as well as the reaction temperature. So it cannot be fixed uniquely but preferably 0.1 hour or more, more preferably 0.5 hour or more. By carrying out the reaction in this preferable time range, it will be possible to sufficiently decrease the amount of unreacted feed material, leading to high-yield production of the cyclic PAS and easy recovery of the resulting cyclic PAS. On the other hand, though there are no specific upper limits to the reaction time, the process of an embodiment of the invention can achieve a very high reaction speed and therefore, the reaction may be sufficiently completed within 10 hours, preferably within 6 hours, and more preferably within 3 hours.

For the production of a cyclic PAS of an embodiment of the invention, there are no specific limitations on the pressure under which the reaction mixture is heated, but under the pressure, it should be possible to heat the reaction mixture above its reflux temperature under atmospheric pressure. The pressure under which the reaction mixture is heated depends on the feed materials and their contents in the reaction mixture, reaction temperature, etc., and cannot be defined uniquely, but the pressure should preferably be 0.05 MPa or more, more preferably 0.3 MPa or more, still more preferably 0.4 MPa or more, in terms of gauge pressure. For its upper limit, the pressure should preferably be 10 MPa or less, more preferably 5 MPa or less. In this preferable pressure range, the production of a cyclic PAS will be able to be completed rapidly. If the organic polar solvent is used in large amounts for the production of a cyclic PAS, i.e., if the contents of the feed linear PAS, sulfidizing agent and dihalogenated aromatic compound are low in the reaction mixture, it is particularly effective to perform the reaction in said preferable pressure range and it will be able to improve the feed material consumption rate and/or the selectivity for the target cyclic PAS. Though the reason has not been known clearly at present, it is inferred that during the production of a cyclic PAS, some feed materials such as the dihalogenated aromatic compound are volatile under the heating conditions for the reaction and partly in the gas phase in the reaction system, possibly preventing the proceed of their reaction with the reactive substrates in the gas phase, and therefore, the use of a pressure in said preferable range will work to depress the volatilization in the feed materials reaction system to allow the reaction to proceed efficiently. To maintain the pressure in said preferable pressure range during the heating of the reaction mixture, it is also preferable to pressurize the inside of the reaction system with an inert gas as described later, during the reaction, or at other appropriate stages, preferably prior to the start of the reaction. The gauge pressure as referred to here is defined as the relative pressure compared with the atmospheric pressure which is calculated by subtracting the atmospheric pressure from the absolute pressure.

In general, a cyclic compound is produced as a result of the formation of bonds in the molecules of the precursoral linear compound with a relatively small number of repeating units. For the cyclic PAS of an embodiment of the invention as well, it is likely that a linear PAS with, for instance, a number of repeating units of m undergoes intramolecular reaction to form a cyclic PAS with a number of repeating units of m. For embodiments of the invention, it is inferred that the feed linear PAS reacts with the sulfidizing agent to form a linear compound with a relatively small number of repeating units that can serve as precursor to the cyclic compound, followed by its conversion into a cyclic compound. If the linear PAS with a number of repeating units of m and the linear PAS with a number of repeating units of n undergo intermolecular reaction, this will produce a linear PAS with a number of repeating units of (m+n). Thus, in general, production of a cyclic compound is accompanied by formation of a large amount of a linear compound as by-product as a result of intermolecular reaction. For cyclic compound production, it is important to allow the intramolecular reaction to proceed preferentially. In the case of PASs, it is known that linear PASs with a large number of repeating units tend to be less soluble in an organic polar solvent whereas the solubility of the PAS component increases with an increasing temperature. Accordingly, if the formation of the linear PAS is to be depressed in order to achieve the production of a cyclic PAS, it is common to use a low reaction temperature, instead of adopting a temperature above the reflux temperature, even in generally known cyclic PAS production processes. On the contrary, if a linear PAS with a high molecular weight is to be produced, a higher reaction temperature is used more frequently for the PAS component to be sufficiently dissolved in the organic polar solvent, and a reaction temperature above the reflux temperature tends to be adopted in generally known high molecular weight PAS production processes. It has been reported that high molecular weight PASs can be produced at a high yield in the latter case. After intensive studies on the production of cyclic PASs, the present inventors to their surprise found that the object of an embodiment of the invention was met successfully at temperatures above the reflux temperature of the reaction mixture, i.e., temperatures that were thought to be preferable for the production of linear PASs with a high molecular weight, and that cyclic PASs in particular were produced rapidly at a high yield, leading to the completion of the invention according to an exemplary embodiment. Furthermore, it was also found that in said preferable temperature region for the production of a cyclic PAS of an embodiment of the invention, not only a cyclic PAS was produced at a high yield, but also the by-product linear PAS had a high molecular weight. Here, the cyclic PAS and the linear PAS with a high molecular weight are largely different in, for instance, the solubility in the solvent, allowing the cyclic PAS and the linear PAS to be separated very easily, which constitutes one of the advantages of the cyclic PAS production process of an embodiment of the invention. Thus, a cyclic PAS with a very high purity can be produced by carrying out the cyclic PAS production process of an embodiment of the invention in combination with, for instance, the cyclic PAS recovery operation described later. On the other hand, the feed linear PAS will not be melted easily in the reaction mixture in the case of generally known cyclic PAS production processes that are performed at a temperature below the reflux temperature, and if the reaction does proceed, the by-product linear PAS will have a low molecular weight because of the lower temperature. Accordingly, the cyclic PAS cannot be separated easily from the linear PAS, making it difficult to produce a cyclic PAS with a high purity.

In the cyclic PAS production process in an embodiment of the invention, a linear PAS, sulfidizing agent, dihalogenated aromatic compound, and organic polar solvent are fed to the reaction vessel to cause reaction in the reaction mixture consisting of these essential components. There are no specific limitations on the order of feeding these essential components into the reaction vessel, but it is preferable to feed first the entirety or part of the organic polar solvent to be used, followed by feeding the other components, in order to ensuring a uniform reaction mixture. In addition to said essential components, the reaction mixture may contain a third component that will not considerably impede the reaction or a third component that will accelerate the reaction. There are no specific limitations on the method for carrying out the reaction, but it is preferable to stir the mixture to ensure a uniform reaction system. There are no specific limitations on the temperature at which said feed materials are fed and, for instance, the feed materials may be supplied around room temperature, followed by carrying out the reaction, or the reaction vessel is adjusted first in the aforementioned temperature range preferable for the reaction, followed by supplying the feed materials and carrying out the reaction. It is also possible to supplying the feed materials one by one into the reaction system in which the reaction is proceeding.

Furthermore, the sulfidizing agent, dihalogenated aromatic compound, linear PAS and organic polar solvent may contain water. In general, when a sulfidizing agent is reacted with a dihalogenated aromatic compound, the reaction speed decreases with an increasing water content in the reaction mixture, it is necessary to reduce the water content accurately. In the process of an embodiment of the invention, however, the reaction proceeds very rapidly, making it possible to carry out the reaction successfully without accurate control of the water content in the reaction mixture. There are no specific limitations on the water content in the reaction mixture in an embodiment of the invention, but at the start of the reaction, i.e., when the conversion degree of the dihalogenated aromatic compound (hereinafter, occasionally abbreviated as DHA) in the reaction system is still zero, the water content is preferably in the range of 0.2 moles or more and 20 moles or less, 0.5 moles or more and 10 moles or less, and still more preferably 0.6 moles or more and 8 moles or less per mole of the sulfur component in the reaction mixture. If the sulfidizing agent, organic polar solvent, dihalogenated aromatic compound, linear PAS and other components in the reaction mixture contain water and the water content in the reaction mixture exceeds the aforementioned range, the water content in the reaction system may be reduced before the start of the reaction or during the reaction to adjust the water content within said range, which would lead to rapid, efficient production of a cyclic PAS. If the water content in reaction mixture is below the said preferable range, on the other hand, it is preferable to add water to adjust the water content in the aforementioned. The conversion degree of a DHA is calculated by the following equation. The amount of the remaining DHA can be determined by the gas chromatography in most cases.

(a) Cases where the amount of dihalogenated aromatic compound is excessive relative to that of the sulfidizing agent in terms of the molar ratio conversion degree (%)={[fed DHA (moles)−remaining DHA (moles)]/[fed DHA (moles)−excess DHA (moles)]}×100%

(b) Cases other than aforementioned cases under (a)

conversion degree (%)={[fed DHA (moles)−remaining DHA (moles)]/[fed DHA (moles)]}×100%

It is also possible, furthermore, that at an appropriate stage when the amount of the feed materials has decreased a little after continuing the reaction for an appropriate period, one or more of the feed components, i.e., linear PAS, sulfidizing agent, dihalogenated aromatic compound and organic polar solvent, is added to further continue the reaction. The amount to be added should be determined after considering the content of the sulfur component in the reaction mixture before the addition, and it is strongly desired that the content of the organic polar solvent after adding feed materials is 1.25 liters or more per mole of the sulfur component in the reaction mixture.

The linear PAS, sulfidizing agent and dihalogenated aromatic compound may be added at any appropriate point when the content of the feed materials has decreased, as described above, but such addition should preferably be performed when the DHA conversion degree is 50% or more, more preferably 70% or more. Addition at such points will enable efficient production of a cyclic PAS.

If addition of feed materials is expected to cause a change in the water content of the reaction mixture, additional operation may be carried out to adjust the water content in said preferable range, and it is also desirable to remove an appropriate amount of water from the reaction mixture before the addition, during the addition or after the addition. If non-water components are removed together with water as the latter is removed from the reaction mixture, sulfidizing agent, dihalogenated aromatic compound and organic polar solvent may be added as needed, or the removed materials may be supplied back to the reaction mixture.

For the production of a cyclic PAS of an embodiment of the invention, a batch type, continuous type or other various generally known polymerization or reaction methods are available. Concerning the atmosphere, the production process should preferably be performed in a nonoxidizing atmosphere, and the preferable atmospheres include nitrogen, helium, and argon and other inert gases. In particular, a nitrogen atmosphere is preferable because of its economic efficiency and handleability. There are no specific limitations on the reaction pressure because its optimum value depends on the type and amount of the feed material and solvent used and the reaction temperature etc., and cannot be defined uniquely.

(7) Recovery Process for Cyclic Polyarylene Sulfide

For the production of a cyclic PAS in an embodiment of the invention, it is possible to separate and recover the cyclic PAS from the reaction mixture resulting from the aforementioned reaction. In addition a cyclic PAS, linear PAS and organic polar solvent, the reaction mixture resulting from the reaction may contain other components such as unreacted sulfidizing agent, dihalogenated aromatic compound, water and by-product salt.

There are no specific limitations on process to recover the PAS component from such a reaction mixture. An available process comprises removing a small or large part, as needed, of the organic polar solvent by distillation or other operations, and allowing the reaction mixture to come in contact, while heating as needed, with a solvent that hardly dissolves the PAS component, but can mix with the organic polar solvent and preferably dissolve the by-product salts, to recover the PAS component in the form of a solid mixture of the cyclic PAS and the linear PAS. Another available process comprises heating the reaction mixture at a sufficiently high temperature to dissolve the cyclic and linear PASs, preferably above 200° C. and more preferably above 230° C., separating the solid component from the soluble component in the reaction mixture by a solid-liquid separation technique to recover a solution that consists at least of the cyclic PAS, linear PAS and organic polar solvent, removing a small or large part, as needed, of the organic polar solvent from this solution by distillation or other operations, and allowing the liquid to come in contact, while heating as needed, with a solvent that hardly dissolves the PAS component, but can mix with the organic polar solvent and preferably dissolve the by-product salts, to recover the PAS component in the form of a solid mixture of the cyclic PAS and the linear PAS. Solvents with such characteristics generally have a relatively high polarity, and their suitability depends on the type of the organic polar solvent used and the by-product salts generated, making it impossible to identify particular ones as preferable. But typical ones include, for instance, water; alcohols such as methanol, ethanol, propanol, isopropanol, butanol, and hexanol; and ketones such as acetone; acetates such as ethyl acetate and butyl acetate; of which water, methanol and acetone are preferable, water being particularly preferable, in view of availability and economic efficiency.

Treatment with such a solvent can serve to reduce the contents of the organic polar solvent and by-product salts in the solid mixture of the cyclic and linear PASs. This treatment causes the cyclic and linear PASs to precipitate as a solid component, making it possible to recover the PAS component in the form of a mixture the cyclic and linear PASs by using a generally known solid-liquid separation technique. Useful solid-liquid separation techniques include, for instance, filtration, centrifugal separation, and decantation. Such a series of treatment steps may be repeated several times as needed, which will serve to further reduce the amount of the organic polar solvent and by-product salts contained in the solid mixture of the cyclic and linear PASs.

Available treatment techniques that use a solvent as described above include mixing the solvent and the reaction mixture, while stirring or heating as necessary. There are no specific limitations on the temperature at which the solvent treatment is performed, but it is preferably in the range of 20° C. to 220° C., more preferably 50° C. to 200° C. Treatment in these ranges is preferable because, for instance, the by-product salts can be removed easily and the treatment can be performed at a relatively low pressure. If water is used as the solvent, it should preferably be distilled water or deionized water, and it is also possible to use, as needed, an aqueous solution containing an organic acid compound such as formic acid, acetic acid, propionic acid, butyric acid, chloroacetic acid, dichloroacetic acid, acrylic acid, crotonic acid, benzoic acid, salicylic acid, oxalic acid, malonic acid, succinic acid, phthalic acid, and fumaric acid; an alkali metal salt and alkaline earth metal salt thereof; an inorganic acid compound such as sulfuric acid, phosphoric acid, hydrochloric acid, carbonic acid, and silicic acid; and ammonium ion. If the solid mixture of cyclic and linear PASs resulting from this treatment contains the solvent used for the treatment, it is possible to dry the mixture as needed to remove the solvent.

In the recovery process describe above, the cyclic PAS is recover as a mixture with the linear PAS (hereinafter, occasionally referred as PAS mixture). Available techniques for separation of the cyclic PAS and the linear PAS include, for instance, a separation method based on the difference in solubility between the cyclic PAS and the linear PAS. More specifically, a solvent that dissolves the cyclic PAS efficiently but hardly dissolves the linear PAS under the conditions where the dissolution of the cyclic PAS is performed is allowed to come in contact with the PAS mixture, while heating as needed, to obtain the cyclic PAS as the solvent-soluble component. Here, the cyclic PAS production process of an embodiment of the invention has the feature that the linear PAS contained in the PAS mixture is obtained as a polymer with a high molecular weight as described above. The difference in the solubility of the cyclic and linear PASs in the solvent is so large that the cyclic PAS can be separated efficiency by the aforementioned solubility-based separation technique. The molecular weight of the linear PAS should preferably be such that the linear PAS has little or no solubility in a solvent that dissolves the cyclic PAS as described later. Its weight average molecular weight is typically 2,500 or more, preferably 5,000 or more, and more preferably 10,000 or more.

There are no specific limitations on the solvent to be used for the separation of cyclic and linear PASs as long as the solvent can dissolve the cyclic PAS. However, the solvent should preferably dissolve the cyclic PAS but hardly dissolve the linear PAS in the environment where the dissolution step is to be carried out, and it is more preferable that the solvent does not dissolve the linear PAS at all. In the reaction system, the PAS mixture is allowed to come in contact with said solvent under atmospheric pressure or a slightly increased pressure. In particular, atmospheric pressure is preferable, and a reaction system for use under such conditions is advantageous in that it can be constructed from low-priced reaction vessel members. In view of this, it is desirable to avoid the use of pressure conditions that require an expensive pressure resistant container. It is preferable to use a solvent that is virtually free of undesired side reactions such as decomposition and crosslinking of PAS components. Preferable solvents to be used for contact with the PAS mixture under reflux under atmospheric pressure include, for instance, hydrocarbon-based solvents such as pentane, hexane, heptane, octane, cyclohexane, cyclopentane, benzene, toluene, and xylene; halogen-based solvents such as chloroform, bromoform, methylene chloride, 1,2-dichloroethane, 1,1,1-trichloroethane, chlorobenzene, and 2,6-dichlorotoluene; ether-based solvents such as diethyl ether, tetrahydrofuran, and diisopropyl ether; and polar solvents N,N-dimethyl formamide, N,N-dimethyl acetamide, dimethyl sulfoxide, trimethyl phosphoric acid, N,N-dimethyl imidazolidinone, and methyl ethyl ketone; of which benzene, toluene, xylene, chloroform, bromo form, methylene chloride, 1,2-dichloroethane, 1,1,1-trichloroethane, chlorobenzene, 2,6-dichlorotoluene, diethyl ether, tetrahydrofuran, diisopropyl ether, N,N-dimethyl formamide, N,N-dimethyl acetamide, dimethyl sulfoxide, trimethyl phosphoric acid, N,N-dimethyl imidazolidinone, and methyl ethyl ketone are more preferable, toluene, xylene, chloroform, methylene chloride, tetrahydrofuran, and methyl ethyl ketone being particularly preferable.

There are no specific limitations on the atmosphere in which the PAS mixture is allowed to come in contact with the solvent, but the operation should preferably be performed in a nonoxidizing atmosphere if the PAS component and/or the solvent are likely to suffer oxidation and degradation under the temperature and time conditions where the contact is made. A nonoxidizing atmosphere as referred to here has a gaseous oxygen concentration of 5 vol. % or less, preferably 2 vol. % or less, and it is more preferably that the atmosphere is virtually free of oxygen. Specifically, such an atmosphere comprises an inert gas such as nitrogen, helium, and argon, of which nitrogen is particularly preferable because of economic efficiency and handleability.

There are no specific limitations on the temperature at which the PAS mixture and the solvent are allowed to come in contact with each other. In general, the solubility of the cyclic PAS in the solvent increases with an increasing temperature, but the dissolution of the linear PAS also tends to be accelerated particularly when it has a high molecular weight. If the molecular weight of the linear PAS is in the aforementioned preferable molecular weight range, the difference in the solubility from the cyclic PAS is so large that the separation between the cyclic and linear PASs can be carried out successfully even if the contact of the PAS mixture and the solvent is made at a high temperature. It is preferable, furthermore, that the contact of the PAS mixture and the solvent is performed under atmospheric pressure, the temperature should preferably be lower than the solvent's reflux temperature under atmospheric pressure as described above. Specifically, if one of the aforementioned preferable solvent is used, the temperature should typically be in the range of 20 to 150° C., preferably 30 to 100° C.

The optimum time period of the contact of the PAS mixture and the solvent depends on the solvent, temperature, etc., and cannot be identified uniquely, but it is typically in the range of 1 min to 50 hours, and the cyclic PAS is expected to be dissolved sufficiently in the solvent in this period.

There are no specific limitations on the technique to cause the PAS mixture to come in contact with the solvent, and generally known common techniques will be useful, including, for instance, mixing and stirring, as needed, the PAS mixture and solvent, followed by recovering the solution; showering the solvent over the PAS mixture placed on a filter to allow the cyclic PAS to be dissolved in the solvent; and performing the Soxhlet extraction technique. There are no specific limitations on the amount of the solvent to be used when causing the PAS mixture to come in contact with the solvent, but the bath ratio between the weight of the solvent and that of the PAS mixture is typically in the range of 0.5 to 100. In this bath ratio range, the PAS mixture and the solvent will be easily mixed uniformly and the cyclic PAS will be easily dissolved in the solvent sufficiently. In general, a higher bath ratio is advantageous for the solvent to dissolve the cyclic PAS, but if it exceeds a certain limit, its effect will not improve any more, or on the contrary, the use of an excessive amount of the solvent will likely to cause an economic disadvantage. A sufficient effect is likely to be achieved even with a small bath ratio if the operation to cause the contact between the PAS mixture and the solvent is performed repeatedly. The Soxhlet extraction, because of its mechanism, can achieve nearly the same effect as repeated operation of contacting between the PAS mixture and the solvent.

If the contact between the PAS mixture and the solvent produces a cyclic PAS solution in the form of solid-liquid slurry containing a solid linear PAS component, a generally known solid-liquid separation technique is preferably used to recover the solution. Typical solid-liquid separation techniques include, for instance, filtration, centrifugal separation, and decantation. The cyclic PAS can be recovered by removing the solvent from the solution thus separated. If part of the cyclic PAS still remains in the solid component, on the other hand, contact with the solvent and recovery of the solution may be carried out repeatedly to enhance the yield of the cyclic PAS. The solid material resulting from the separation of the cyclic PAS solution by this operation will be valuable as high purity linear PAS material containing the linear PAS as major component, and after carrying out treatment such as solvent removal as needed, a part of it or its entirety can be used effectively again as feed material of producing the cyclic PAS of an embodiment of the invention.

The cyclic PAS can be obtained as solid material by removing the solvent from the solution containing the cyclic PAS produced above. This solvent removal can be achieved, for instance, by heating under atmospheric or lower pressure, or by using a membrane to remove the solvent. For this solvent removal, heating under atmospheric or lower pressure is preferable because the cyclic polyarylene sulfide cane be produced efficiently at a high yield. Here, the cyclic PAS solution produced as described above can contain solid material depending on the temperature. Since such solid material is regarded as a cyclic polyarylene sulfide mixture, it is desirable to recover the material together with the solvent-soluble components when the solvent is removed, making it possible to obtain the cyclic PAS at a yield. By this solvent removal step, it is desirable to remove at least 50 wt % or more, preferably 70 wt % or more, still more preferably 90 wt % or more, and still more preferably 95 wt % or more, of the solvent. The optimum heating temperature for the solvent removal depends on the characteristics of the solvent used and cannot be defined uniquely, but heating is performed commonly at 20 to 150° C., preferably 40 to 120° C. The solvent removal should preferably be carried out under atmospheric or less pressure, which makes it possible to perform the solvent removal at a lower temperature.

(8) Other Operations Including Post-Treatment

A cyclic polyarylene sulfide thus produced has a sufficiently high purity and can serve preferably for various uses, but the purity of the cyclic PAS can be further increased by performing additional post-treatment as described below.

The cyclic PAS material produced by the operations described under (1) to (7) can contain impurities coming from the PAS mixture depending on the characteristics of the solvent. In many cases, such impurities can be removed selectively by allowing the cyclic PAS containing a small amount of impurities with a second solvent that dissolves the impurities but does not dissolve or hardly dissolves the cyclic PAS.

In the reaction system, the cyclic PAS mixture is allowed to come in contact with said second solvent under atmospheric pressure or a slightly increased pressure. In particular, atmospheric pressure is preferable, and a reaction system for use under such conditions is advantageous in that it can be constructed from low-priced members. In view of this, it is desirable to avoid the use of pressure conditions that require an expensive pressure resistant container. It is preferable to use a second solvent that is virtually free of undesired side reactions such as decomposition and crosslinking of the cyclic PAS. The preferable solvents include, for instance, alcohol- and phenol-based solvents such as methanol, ethanol, propanol, butanol, pentanol, ethylene glycol, propylene glycol, phenol, cresol, and polyethylene glycol; hydrocarbon-based solvents such as pentane, hexane, heptane, octane, cyclohexane, and cyclopentane; ketone-based solvents such as acetone, methyl ethyl ketone, diethyl ketone, methyl isobutyl ketone, methylbutyl ketone, and acetophenone; and carboxylate-based solvents such as methyl acetate, ethyl acetate, pentyl acetate, octyl acetate, methyl butyrate, ethyl butyrate, pentyl butyrate, methyl salicylate, and ethyl formate; of which methanol, ethanol, propanol, butanol, pentanol, ethylene glycol, propylene glycol, pentane, hexane, heptane, octane, cyclohexane, cyclopentane, acetone, methyl acetate, and ethyl acetate preferable, methanol, ethanol, propanol, ethylene glycol, pentane, hexane, heptane, octane, cyclohexane, acetone, and ethyl acetate being particularly preferable. These solvents may be used singly or as a mixture of two or more thereof.

There are no specific limitations on the temperature at which the cyclic PAS is caused to come in contact with a second solvent, but it is desirable to control the temperature at or below the reflux temperature of the second solvent under atmospheric pressure. If a preferable second solvent as described above is used, the temperature should preferably be controlled, for instance, in the range of 20 to 100° C., more preferably 25 to 80° C.

The optimum time period of the contact of the cyclic PAS and the second solvent depends on the solvent, temperature, etc., and cannot be identified uniquely, but it is typically in the range of 1 min to 50 hours, and the impurities in the cyclic PAS component is expected to be dissolved sufficiently in the second solvent in this time period.

The methods to allow the cyclic PAS to come in contact with the second solvent include mixing the cyclic PAS in a solid state with the second solvent, while stirring as needed; showering the second solvent over the cyclic PAS in a solid state on a filter to allow the impurities to be dissolved in the second solvent; subjecting the cyclic PAS in a solid state to Soxhlet extraction using the second solvent; and allowing the cyclic PAS in a solution or slurry of the cyclic PAS containing a solvent to come in contact with the second solvent to allow the cyclic PAS to precipitate under the existence of the second solvent. In particular, the technique of allowing slurry of the cyclic PAS containing a solvent to come in contact with the second solvent can effectively produce the cyclic PAS with high purity.

After the contact of the cyclic PAS with the second solvent, it is possible to recover the cyclic PAS in a solid state by a generally known solid-liquid separation technique. Typical solid-liquid separation techniques include, for instance, filtration, centrifugal separation, and decantation. If impurities still remain in the cyclic PAS obtained after the solid-liquid separation, the contact of the cyclic PAS with the second solvent may be carried out again to remove the impurities.

(9) Characteristics of the Cyclic Pas of an Embodiment of the Invention

The cyclic PAS material thus produced commonly has a high purity with the cyclic PAS content in the range of 50 wt % or more, preferably 70 wt % or more, and more preferably 80 wt % or more. Such material has different characteristics from linear PASs produced by a common technique and has a high industrial value. The cyclic PAS material produced by the process of an embodiment of the invention has the feature that cyclic PAS molecules of said Formula (Q) with different m values in the range of 4 to 50, instead of a single m value in said Formula (Q), can be produced. Here, the value of m is preferably in the range of 4 to 25, more preferably 4 to 20. If the value of m is in this range, polymerization reaction proceeds rapidly when the cyclic PAS is subjected to ring opening polymerization as described later, and the resulting polymer is expected to have a high molecular weight. The reason for this has not been known clearly, but it is inferred that because of being cyclic, cyclic PAS molecules in this range tend to have distorted bonds, making ring opening reaction to take place easily during polymerization.

A cyclic PAS with a single m value is commonly obtained in the form of single crystal and therefore, has a very high melting point, but in embodiments of the present invention, the cyclic PAS tends to be obtained in the form of a mixture of molecules with different m values. Thus the resulting cyclic PAS material will have a lower melting point. This is advantageous in, for instance, that the heating temperature required to melt the cyclic PAS can be lowered.

(10) Resin Composition Comprising the Cyclic Pas of an Embodiment of the Invention A cyclic PAS produced by the process of an embodiment of the invention can be used as a mixture with various resins, such a resin composition containing a cyclic PAS has a strong tendency to show high flowability when during melting operation and also tends to have high retention stability. Such characteristics, improved flowability in particular, allow the resin composition to show high melt processability even if the heating temperature for melting is low and therefore, they are very advantageous in that high melt processability can be maintained when the resin composition is processed into injection moldings and extrusion moldings such as fiber and film. The reason for such improvement in characteristics achieved by mixing the cyclic PAS with resin has not been known, but it is inferred that the structural feature of the cyclic PAS, i.e., its cyclic structure, allows the molecules to have a compact structure, leading to less entanglements with the molecules of various resins used as matrix. It is also likely that the cyclic PAS can act as plasticizer for various resins and also that it can serve to reduce the entanglements among molecules of the matrix resin.

There are no specific limitations on the content of the cyclic PAS in various resin compositions, but significant improvement in characteristics can be achieved when the content of the cyclic PAS in an embodiment of the invention is in the range of 0.1 to 50 parts by weight, preferably 0.5 to 20 parts by weight, and more preferably 0.5 to 10 parts by weight, relative to 100 parts by weight of various resins.

The aforementioned resin composition may contain a fibrous and/or nonfibrous filler as needed, and its content is typically in the range of 0.5 to 400 parts by weight, preferably 0.5 to 300 parts by weight, more preferably 1 to 200 parts by weight, still more preferably 1 to 100 parts by weight, relative to 100 parts by weight of said various resins. This can serve to improve the mechanical strength while maintaining a high flowability. Such a filler may be fibrous, plate-like, powdery, or particulate. Specifically, the preferable fillers include glass fiber, talc, walastenite, and montmorillonite, as well as layer-like silicate-based materials such as synthetic myca, of which glass fiber is particularly preferable. There are no specific limitations on the type of the glass fiber to be used if it commonly serves for reinforcement of resin. Useful glass fiber materials include, for instance, milled fiber and chopped strands of continuous fiber and short fiber. Two or more of the aforementioned fillers may be used in combination. Such a filler as described above used for embodiments of the invention may have a surface treated with a generally known coupling agent (for instance, silane-based coupling agent, and titanate-based coupling agent) or other surface treatment agent. The glass fiber may be coated or bundled with thermoplastic resin, such as ethylene/vinyl acetate copolymer, or thermosetting resin, such as epoxy resin.

To maintain heat stability, the resin composition may contain one or more phenolic or phosphorous compounds as heat resisting agent. To achieve desired heat resistant improvement, the content of such a heat resisting agent should preferably be 0.01 parts by weight or more, particularly preferably 0.02 parts by weight or more, relative to 100 parts by weight of said resin, whereas it should preferably be 5 parts by weight or less, particularly 1 parts by weight or less, in view of the gas components to be generated during the molding process. In particular, it is highly preferable to use phenolic and phosphorous compounds in combination to maintain heat resistance, heat stability, and flowability.

Furthermore, said resin composition main contain compounds as follows: coupling agents such as organic titanate-based compounds and organic borane-based compounds; plasticizers such as polyalkylene oxide oligomer-based compounds, thioether-based compounds, ester-based compounds, and organic phosphorous compounds; crystal nucleating agents such as talc, kaolin, organic phosphorus compounds, and polyether ether ketone; metal soap such as montanic acid wax, lithium stearate, and aluminum stearate; mold releasing agents such as ethylene diamine/stearate/sebacic acid condensation polymers and silicone-based compounds; color protection agents such as hypophosphite; and other common additives such as lubricants, ultraviolet ray prevention agents, coloring agents, flame retardants, and foaming agents. These compounds tend to work effectively when their content is less than 20 parts by weight, preferably 10 parts by weight or less, more preferably 1 part by weight or less, relative to 100 parts by weight of said resin.

There are no specific limitations on the technique to be used to produce resin compositions containing a cyclic PAS as described above, but their production can be achieved by, for instance, blending a cyclic PAS and various resins along with other fillers and various additives as needed, followed by melt-kneading above the melting point of said various resins and cyclic PAS with a generally known melt mixer such as uniaxial or twin screw extruder, Banbury mixer, kneader, and mixing roll; or mixing them in a solution followed by removing the solvent. Here, if the cyclic PAS material comprises one cyclic PAS species that has a fixed m value in said Formula (Q) or if it is a mixture of multiple species with different m values and with high crystallinity and high melting point, the cyclic PAS may be dissolved, before being supplied, in the solvent to be used for the process, followed by supplying the solution and removing the solvent during the melt-kneading step. Other available processes include dissolving the cyclic PAS above its melting point and then quenching the solution to prevent crystallization, followed by supplying the material in an amorphous state; and adjusting the premelter to a temperature above the melting point of the cyclic PAS, melting only the cyclic PAS in the premelter, followed by supplying the material in a melt state.

There are no specific limitations on the type of the resin to be combined with the cyclic PAS, and it may be a thermoplastic resin, which may be crystalline or amorphous, or a thermosetting resin.

Here, typical crystalline resins include, for instance, polyolefin resin, such as polyethylene, polypropylene, and syndiotactic polystyrene, polyvinyl alcohol resin, polyvinylidene chloride resin, polyester resin, polyamide resin, polyacetal resin, polyphenylene sulfide resin, polyether ether ketone resin, polyether ketone resin, polyketone resin, polyimide resin and copolymers thereof, which may be used singly or in combination. In particular, polyphenylene sulfide resin, polyamide resin, and polyester resin are preferable in terms of heat resistance, moldability, flowability and mechanical characteristics. Polyester resin is preferable in terms of the transparency of moldings to be produced. If crystalline resin is used as the resin component, it will serve to achieve improvement of crystallization characteristics as well as the aforementioned increase in flowability. The use of polyphenylene sulfide resin as the resin component is also particularly preferable because in this case, not only the flowability and crystallinity will improve, but also such improvement, in turn, will lead to a significant reduction of burrs during the subsequent injection molding process.

There are no specific limitations on the type of the amorphous resin as long as it is amorphous and melt moldable, but in view of heat resistance, their glass transition temperature is preferably 50° C. or more, more preferably 60° C. or more, still more preferably 70° C. or more, and still more preferably 80° C. or more. There are no specific limitations on the upper limit, but in view of moldability etc., but their glass transition temperature is preferably 300° C. or less, more preferably 280° C. or less. For an embodiment of the invention, the glass transition temperature of amorphous resin is determined by differential calorimetry as follows: heat the amorphous resin from 30° C. up to a temperature above the expected glass transition temperature at heating rate of 20° C./min, maintain the temperature for 1 min, cool the resin down to 0° C. at a cooling rate of 20° C./min, maintain the temperature for 1 min, heating it again at a heating rate of 20° C./min, measure the glass transition temperature (Tg) during this heating period. Specifically, such resin may be at least one selected from the group of amorphous nylon resin, polycarbonate (PC) resin, polyallylate resin, ABS resin, poly(meth)acrylate resin, and poly(meth)acrylate copolymer, polysulfone resin, and polyethersulfone resin, which may be used singly or in combination with one or more thereof. Of these amorphous resins, polycarbonate (PC) resin, ABS resin (particularly transparent ABS resin), polyallylate resin, poly(meth)acrylate resin, and poly(meth)acrylate copolymer, and polyethersulfone resin are preferable because they can have very high transparency. If amorphous resin is used as matrix resin, the use of a highly transparent amorphous resin is advantageous not only in that high flowability can be achieved during the melt processing step as described above, but also in that the high transparency can be maintained. As said cyclic PAS, a mixture of cyclic PAS molecules with different m values in said Formula (Q) is preferably used if an amorphous resin composition with high transparency is desired. If cyclic PAS material comprising molecules with the same m value in said Formula (Q) is used as said cyclic PAS, such cyclic PAS material tend to have a high melting point and fail to disperse sufficiently when melt-kneaded with amorphous resin, possibly forming aggregates in the resin or reducing the transparency. A mixture of cyclic PAS molecules with different m values in said Formula (Q) will have a lower melting point as described above, which will serve effectively to improve the uniformity during the melt-kneading step. Here, the cyclic PAS produced by the production process of an embodiment of the invention has the feature of being a mixture of molecules with different m values of 4 to 50, instead of a single value, in said Formula (Q), and its use is particularly advantageous when an amorphous resin composition with high transparency is to be prepared.

A resin composition from a matrix resin and a cyclic PAS produced as described above can be molded by a commonly known techniques such as injection molding, extrusion molding, blow molding, press molding, and spinning to provide various forms of moldings. Such moldings include injection moldings, extrusion moldings, blow moldings, film, sheet, and fiber. The resulting various moldings can be used to manufacture various products such as automobile parts, electric and electronic parts, construction members, various containers, daily commodities, everyday sundries and sanitary articles. Furthermore, the aforementioned resin composition and moldings produced therefrom can be recycled. For instance, said resin compositions and moldings produced therefrom is crushed preferably into powder and additives are added as needed to prepare a resin composition, which may be used in the same as the aforementioned resin composition for moldings production or recycling.

(11) Conversion of Cyclic PAS into High Polymer

The cyclic PAS produced according to and embodiment of the invention have good characteristics as described above under (9), and can serve as prepolymer to produce a polymer through ring opening polymerization. As said prepolymer, the cyclic PAS produced by the cyclic PAS process of an embodiment of the invention may be used singly or as a mixture with an appropriate amount of other components. If a component other than the cyclic PAS is added, it is preferably be a PAS component such as a linear PAS and a branched PAS. Material that at least contains the cyclic PAS of an embodiment of the invention and can be converted into a high polymer by a process as described below is hereinafter referred to as polyarylene sulfide prepolymer, or PAS prepolymer.

Ring opening polymerization of the cyclic PAS can be carried out under the conditions where the cyclic PAS undergoes ring opening to form a polymer with a high molecular weight. A typical preferable process comprises heating a PAS prepolymer containing the cyclic PAS prepared by the cyclic PAS production process of an embodiment of the invention to be converted into a high polymer. This heating temperature should preferably be as high as necessary to melt said PAS prepolymer, and there are no specific limitations if the temperature meets this temperature condition. If the heating temperature is lower than the melting point of the PAS prepolymer, a long heating period will be necessary to produce a PAS with a high molecular weight. The temperature at which the PAS prepolymer melts depends on the composition and molecular weight of the PAS prepolymer and the environment for heating and cannot be determined uniquely, but the melting point can be estimated based on, for instance, differential scanning calorimetry analysis of the PAS prepolymer. If the heating temperature is too high, undesired side reactions such as crosslinking between PAS prepolymer molecules, between resulting PAS molecules, or between PAS molecules and polyarylene sulfide prepolymer molecules, as well as their decomposition, will likely to take place, leading to deterioration in the characteristics of the PAS produced. It is preferable to avoid the use of a temperature where such undesired side reactions take place significantly. To depress the progress of such undesired side reactions, heating is performed typically at a temperature in the range of 180 to 400° C., preferably 200 to 380° C., and more preferably 250 to 360° C. If some side reactions are permitted, on the other hand, the temperature may be in the range of 250 to 450° C., preferably 280 to 420° C. In this case, it is advantageous that the conversion into a polymer with a high molecular weigh can be completed in a very in a short period of time.

The required time for said heating depends on the content of the cyclic PAS in the PAS prepolymer, its m value, molecular weight and other various characteristics, and cannot be defined uniquely, but should preferable be adjusted so that said undesirable side reactions will be depressed as effectively as possible. The heating time is typically in the range of 0.05 to 100 hours, preferably 0.1 to 20 hours, and more preferably 0.1 to 10 hours. The PAS prepolymer will not be converted sufficiently into a PAS if the heating time is less than 0.05 hour, whereas if it exceeds 100 hours, not only the undesirable side reactions will have undesired effect on the characteristics of the resulting PAS but also it will cause economically disadvantageous effect.

When heating the PAS prepolymer for conversion into a high polymer, various catalyst components may be used to promote the conversion. Such catalyst components include ionizable compounds and radical-generating compounds. Such ionizable compounds include, for instance, sodium salts and lithium salts thiophenol, alkali metal salts of sulfur, while said radical-generating compounds include, for instance, compounds that generate sulfur radicals when heated, specifically compounds containing disulfide bonds. If catalyst components are used, such catalyst components will be commonly taken in the PAS, and the resulting PAS will most likely contain the catalyst components. In particular, if an ionizable compound containing alkali metal and/or other metal components as catalyst, a large part of the metal components will be likely to remain in the resulting PAS product. If such catalyst components are used, the resulting PAS tends to suffer a larger weight loss when it is heated. It is preferable to minimize or avoid the use of such catalyst components if a higher purity PAS and/or a PAS free of weight loss when heated is desired. Thus, when said catalyst components are used to convert a PAS prepolymer into a high polymer, the amount of the catalyst components to be added should be adjusted so that the content of the alkali metals, including the PAS prepolymer and catalyst components, in the reaction system should be 100 ppm or less, preferably 50 ppm or less, more preferably 30 ppm or less, and still more preferably 10 ppm or less, and simultaneously, the weight of disulfide relative to the total weight of sulfur in the reaction system should be less than 1 wt %, preferably less than 0.5 wt %, more preferably less than 0.3 wt %, and still more preferably less than 0.1 wt %.

The heating of the PAS prepolymer for conversion into a high polymer is commonly performed without using a solvent, but may be performed under the existence of a solvent. There are no specific limitations on the type of solvent to be used if it virtually does not impede the conversion of a heated PAS prepolymer into a high polymer or cause undesirable side reaction such as crosslinking or decomposition of the resulting PAS. Typical ones include, for instance, nitrogen-containing polar solvents such as N-methyl-2-pyrrolidone, dimethyl formamide, and dimethyl acetamide; sulfoxide- or sulfone-based solvents such as dimethyl sulfoxide and dimethyl sulfone; ketone-based solvents such as acetone, methyl ethyl ketone, diethyl ketone, and acetophenone; ether-based solvents such as dimethyl ether, dipropyl ether, and tetrahydrofuran; halogen-based solvents such as chloroform, methylene chloride, trichloroethylene, ethylene dichloride, dichloroethane, tetrachloroethane, and chlorobenzene; alcoholic or phenolic solvents such as methanol, ethanol, propanol, butanol, pentanol, ethylene glycol, propylene glycol, phenol, cresol, and polyethylene glycol; and aromatic hydrocarbon-based solvents such as benzene, toluene, and xylene. It is also possible to use inorganic compounds such as carbon dioxide, nitrogen, and water in a supercritical fluid state. These solvents may be used singly or as a mixture of two or more thereof.

Said conversion of a heated PAS prepolymer into a high polymer may be performed, needless to say, in common polymerization equipment, but also may be performed in a mold designed for moldings production, extruder, melt-kneading equipment, or any other equipment that has a heating mechanism, Furthermore, a batch type, continuous type or other generally known processes may be adopted.

Concerning the atmosphere, said conversion of a heated PAS prepolymer into a high polymer is preferably carried out in a nonoxidizing atmosphere, and it is also preferable to use reduced pressure conditions. If the conversion is performed under reduced pressure, it is preferable to create first a nonoxidizing atmosphere in the reaction system, followed by reducing the pressure. This is likely to work to depress undesired side reactions such as crosslinking between PAS prepolymer molecules, between resulting PAS molecules, or between PAS molecules and PAS prepolymer molecules, as well as their decomposition. A nonoxidizing atmosphere as referred to here has a concentration of gaseous oxygen in contact with the PAS component of 5 vol. % or less, preferably 2 vol. % or less, and it is more preferably that the atmosphere is virtually free of oxygen. Specifically, such an atmosphere comprises an inert gas such as nitrogen, helium, and argon, of which nitrogen is particularly preferable because of economic efficiency and handleability. Reduced pressure refers to a pressure lower than atmospheric pressure in the reaction system. For its upper limit, it is preferably 50 kPa or less, more preferably 20 kPa or less, and still more preferably 10 kPa or less. For its lower limit, it is preferably 0.1 kPa or more, and more preferably 0.2 kPa or more. Undesired side reactions such as crosslinking will be likely to take place if the pressure reduction is larger than the preferable upper limit whereas depending on the reaction temperature, low molecular weight molecules of the cyclic polyarylene sulfide will be likely to evaporate if it is less than the lower limit.

Said conversion of a PAS prepolymer into a high polymer can be performed under the coexistence of a fibrous substance. Here, a fibrous substance is defined as a thin, filamentous substance and preferably has a long, thin structure like natural fiber. A composite material structure comprising a PAS and a fibrous substance can be easily produced by carrying out the conversion of a PAS prepolymer into a high polymer under the existence of a fibrous substance. Since such a structure is reinforced with the fibrous substance, it tends to have, for instance, better mechanical characteristics as compared with the use of the PAS alone.

Here, of the various fibrous substances, the use of continuous fiber as reinforcement is preferable, which allows the PAS to be reinforced to a high degree. In general, when a composite material structure comprising resin and a fibrous substance is produced, it will be difficult for the resin to wet the fibrous substance sufficiently because the molten resin is highly viscous, often preventing the production of uniform composite material and development of expected mechanical characteristics. Wetting as referred to here is defined as the existence of good contact between the a fluid substance such as molten resin and a solid substance such as a fibrous compound, i.e., a contact where good physical conditions are maintained between the fluid substance and the solid substance to virtually prevent air or other gas from being captured. Here, a fluid substance with lower viscosity tends to achieve better wetting with a fibrous substance. The PAS prepolymer of an embodiment of the invention in a molten state has a viscosity that is considerably lower than that of common thermoplastic resins such as PAS and is likely to develop good wetting with a fibrous substance. The PAS production process of an embodiment of the invention can convert the PAS prepolymer into a high polymer after the PAS prepolymer has wet the fibrous substance sufficiently. Thus, a composite material structure with good wetting between a fibrous substance and a high polymer (polyarylene sulfide) can be produced easily.

As said fibrous substance, a continuous fiber used as reinforcement is preferable as described above. There are no specific limitations on the type of reinforcement fiber to be used for the invention, the reinforcement fibers that are used preferably include fibers with high heat resistance and high tensile strength that are commonly used as high-performance reinforcement fiber. For instance, such reinforcement fibers include glass fiber, carbon fiber, graphite fiber, aramid fiber, silicon carbide fiber, alumina fiber, and boron fiber. Of these, carbon fiber and graphite fiber are most preferable because they have specific strength and specific modulus high and can contribute to manufacturing lightweight products. Concerning the carbon fiber and graphite fiber, various types of carbon fibers and graphite fibers can be useful, but the most suitable is high-strength, high-elongation carbon fiber with a tensile strength of 450 Kgf/mm$^2$ and a tensile elongation of 1.6% or more. If long fiber is used for reinforcement, its length is preferably 5 cm or more. If the length is in this range, the strength of the reinforcement fiber can be easily maintained sufficiently in the composite material. Said carbon fiber and graphite fiber may be used as a mixture with other reinforcement fibers. There are no limitations on the shape and arrangement of the reinforcement fibers to be used, and they may be used in the form of, for instance, unidirectionally orientated material, randomly orientated material, sheet, mat, woven fabric, or braid. For uses requiring a high specific strength and specific modulus, in particular, material comprising reinforcement fibers oriented in a single direction is the most suitable, but material comprising reinforcement fibers in two perpendicular directions (woven fabric) are also suitable for the invention because of their high handleability.

Furthermore, said conversion of a PAS prepolymer into a high polymer may be performed under the existence of a filler. Useful fillers include, for instance, nonfibrous glass, nonfibrous carbon, and other inorganic fillers such as calcium carbonate, titanium oxide, and alumina.

(12) PAS

According to said (11), it is possible to produce a very industrially useful PAS. Here, a PAS is defined as a homopolymer or a copolymer that comprises the repeating unit represented by the formula —(Ar—S)— as major constituent, and the content of said repeating unit is preferably 80 mol % or more. The component Ar is a unit as represented by said Formulae (A) to (L), of which a unit as represented by Formula (A) is particularly preferable.

As long as this repeating unit is the major constituent unit, the material may contain a small amount of branch units or crosslinking units as represented by said Formulae (M) to (O). The content of these branch units and crosslinking units in the copolymer is preferably in the range of 0 to 1 mol % per mole of the —(Ar—S)— unit.

A PAS produced through a preferable embodiment of the invention may be a random copolymer, block copolymer or a mixture thereof that contains a repeating unit as given above. Typical materials include polyphenylene sulfides, polyphenylene sulfide sulfones, polyphenylene sulfide ketones, random copolymers there of, block copolymers thereof, and mixtures thereof. Particularly preferable PASs include polyphenylene sulfides (hereinafter, occasionally abbreviated PPSs) that contain, as the polymer's major constituent unit, a p-phenylene sulfide up to 80 mol % or more, preferably 90 mol % or more.

There are no specific limitations on the molecular weight of the PASs produced through a preferred embodiment of this invention, but it is preferably in the range of 10,000 or more, more preferably 15,000 or more, still more preferably 18,000 or more, in weight average molecular weight. PASs with a weight average molecular weight of 10,000 or more has high moldability during processing, and moldings produced from them tend to have good characteristics including mechanical strength and chemical resistance. There are no specific limitations on the upper limit of their weight average molecular weight, but it is preferably less than 1,000,000, more preferably less than 500,000, still more preferably less than 200,000, and high molding processability can be maintained if it is this range.

The width of molecular weight distribution of the PASs produced through preferred embodiments of this invention, i.e., the polydispersity represented by the ratio of the weight average molecular weight and the average molecular weight (weight average molecular weight/average molecular weight), is typically 4.0 or less, preferably 2.5 or less, more preferably 2.3 or less, still more preferably, 2.1 or less, and still more preferably 2.0 or less. In the case of PASs with a polydispersity of 4.0 or less, most of them are low in the content of low molecular weight components, and PASs in this range will serve to produce moldings having good mechanical characteristics, with decreased gas generation during heating and decreased material elution during contact with the solvent. Here, the weight average molecular weight and number average molecular weight can be determined by, for instance, SEC (size exclusion chromatography) using a differential refract meter.

There are no specific limitations on the melt viscosity the PASs produced through preferred embodiments of this invention, but in general, their melt viscosity is preferably in the range of 5 to 10,000 Pa·s (300° C., shear velocity 1,000/sec).

The PASs produced through preferred embodiments of this invention have the feature that their purity is higher than that of conventional PAS material and that the content of alkali metal impurities tends to be 100 ppm or less. The alkali metal content is preferably 50 ppm less than, more preferably 30 ppm or less, and still more preferably 10 ppm or less. If the alkali metal content is 100 ppm or less, the material will be likely to have high reliability in uses, for instance, that require good electric insulation characteristics. Here, the alkali metal content in a PAS of an embodiment of the invention is calculated from, for instance, the amount of alkali metal contained in ash remaining after calcining the PAS in an electric furnace, and said amount can be determined by analyzing said ash by, for instance, ion chromatography or the atomic absorption method.

In addition, the PASs produced through preferred embodiments of this invention also have the feature that when heated, they suffer a considerably less weight loss as compared the conventional PAS material. Specifically, the weight loss tends to be represented by the following Formula (I):

$$\Delta Wr = (W1 - W2)/W1 \times 100 \leq 0.18 (\%) \quad (1)$$

where ΔWr denotes the weight loss rate (%) of a specimen heated in a nonoxidizing atmosphere under atmospheric pressure from 50° C. up to an appropriate temperature above 330° C. at a heating rate of 20° C./min, and W1 and W2 denote the weight measured when the temperature reaches 100° C. and 330° C., respectively.

The PASs produced through preferred embodiments of this invention tend to have good characteristics with a very small ΔWr of 0.18% or less, preferably 0.15% or less, and more preferably 0.12% or less. The PASs with a ΔWr in said range have a tendency, for instance, to suffer less gas generation during molding and less deposits on the orifice and die during extrusion molding or on the mold during extrusion molding, leading to improved productivity. To the knowledge of the inventors, generally known PASs have a ΔWr above 0.18%, while the PASs produced through preferred embodiments of this invention are different from the generally known PASs in terms of molecular weight distribution and impurities content. It is inferred that as a result of this, they can have a very high purity, leading to a considerable decrease in the value of ΔWr.

The value of ΔWr van be determined by a common thermogravimetric analysis technique, but this analysis should be in a nonoxidizing atmosphere under atmospheric pressure. A nonoxidizing atmosphere is such that the oxygen concentration in the gas phase in contact with the specimen is 5 vol. % or less, preferably 2 vol. % or less, and more preferably virtually free of oxygen, i.e., filled with an inert gas such as nitrogen, helium, and argon, and in particular a nitrogen atmosphere is highly preferable in view of the economic efficiency and handleability. Atmospheric pressure as referred to here is the pressure in the atmosphere nearly in the standard state and more specifically, it refers to atmospheric pressure conditions at about a temperature of 25° C. under about an absolute pressure of 101.3 kPa. In a measuring atmosphere other than these, the PAS will suffer, for instance, oxidation during measurement, and the atmosphere will be very different from the one practically used for molding of PASs, failing to provide measurements that can serve for practical use of the PASs. For the measurement of ΔWr, thermogravimetric analysis is performed with the temperature raised from 50° C. up to an appropriate temperature above 330° C. at a heating rate of 20° C./min. Preferably, the temperature is held at 50° C. for 1 min, followed by heating at a heating rate of 20° C./min for the thermogravimetric analysis. This temperature range represents the temperatures frequently used when PASs such as polyphenylene sulfide are applied to practical uses and also when solid PASs are melted and molded into desired shapes. The weight loss rate in such a practical service temperature region have relations with the rate of gas release from the PAS being used and he amount of deposits on the orifice and die during molding. Thus, PASs with a weight loss rate in such a temperature range can be regarded as superior in quality. The measurement of ΔWr is preferably performed with a specimen of about 10 mg in the form of fine particles of about 2 mm or less.

(13) Characteristics of PAS

The PASs produced through preferred embodiments of this invention have high heat resistance, chemical resistance, fire retardance, electric properties and mechanical properties, and in particular, they tend to have a narrow molecular weight distribution with a considerably low metal content as compared with the conventional PASs. As a result, they have a very high molding processability as well as very good mechanical characteristics and electric characteristics, serving not only for injection molding, injection compression molding, and blow molding, but also for extrusion molding to provide sheets, films, fibers, pipes, and other extrusion moldings.

To manufacture PAS film from the PASs produced through preferred embodiments of this invention, generally known techniques to produce film from melts can be used, and such techniques include, for instance, melting the PAS in a uniaxial or biaxial extruder, extruding the PAS through a film die, and cooling the material on a cooling drum to provide film, and biaxially stretching the resulting film with a roller-type longitudinal drawing apparatus and a transverse drawing apparatus called tenter to perform stretching in the longitudinal and transverse directions, respectively, though other techniques may also be used.

To manufacture PAS fiber from the PASs produced through preferred embodiments of this invention, generally known melting spinning techniques can be used. For instance, PAS chips used as feed material are supplied to a uniaxial or biaxial extruder where it is kneaded, and then extruded through a polymer flow line switchover apparatus installed at the end of the extruder, filtration layer and spinning orifice, followed by cooling, stretching, and heat-setting. Other techniques, however, may also be used.

The PASs produced through preferred embodiments of this invention may be used singly or in combination, as desired, with inorganic fillers such as glass fiber, carbon fiber, titanium oxide, and calcium carbonate, or other additives such as antioxidant, thermal stabilizer, ultraviolet absorber, and coloring agent. They also may be mixed with resins including polyamide, polysulfone, polyphenylene ether, polycarbonate, polyethersulfone, polyester (such as polyethylene terephthalate and polybutylene terephthalate), polyethylene, polypropylene, polytetrafluoroethylene, olefin-based copolymer with a functional group (such as epoxy group, carboxyl group, carboxylate group, and anhydride group), polyolefin-based elastomer, polyether ester elastomer, polyether amide elastomer, polyamide-imide, polyacetal, and polyimide.

(14) Uses of PAS

The PASs produced through preferred embodiments of this invention have various good characteristics, including molding processability, mechanical characteristics and electric characteristics, and their uses include, for instance, sensor, LED lamp, connector, socket, resistor, relay case, switch, coil bobbin, capacitor, variable capacitor case, optical pickup, vibrator, various end plates, transformer, plug, print base plate, tuner, speaker, microphone, headphone, small motor, magnetic head base, power module, semiconductor, liquid crystal, FDD carriage, FDD chassis, motor brush holder, parabolic antenna, computer-related and other electric/electronic parts, video tape recorder parts, TV parts, iron, hair drier, rice cooker parts, microwave oven parts, sound parts, audio/laser Disk®, compact disc, digital video disk, other audio/video equipment parts, lighting parts, refrigerator parts, air conditioner parts, typewriter parts, word processor parts, other household/office electric appliance parts; office computer related parts, telephone related parts, facsimile related parts, copier related parts, washing jig, motor parts, lighter, typewriter, other machine related parts, microscope, binocular, camera, clock, other optical devices, precision machine related parts, water faucet valve, combination faucet, pump parts, pipe joint, water flow rate control valve, relief valve, hot water temperature sensor, water flow rate sensor, water meter housing, water supply system parts, valve alternator terminal, alternator connector, IC regulator, potentiometer base, exhaust gas valve, other various valves, fuel/exhaust/suction-related various pipes, air intake nozzle snorkel, intake manifold, fuel pump, engine cooling water joint, carburetor's main body, carburetor spacer, exhaust gas sensor, cooling water sensor, oil temperature sensor, throttle position sensor, crank shaft position sensor, air flow meter, brake pad abrasion sensor, air conditioner's thermostat base, heater's air flow control valve, radiator motor's brush holder, water pump impeller, turbine vane, wiper motor relation parts, distributor starter switch, starter relay, transmission wire harness, window washer nozzle, air conditioner's panel switch base plate, fuel relation electromagnetic valve coil, fuse connector, horn terminal, electrical equipment parts' insulation plate, step-motor rotor, lamp socket, lamp reflector, lamp housing, brake piston, solenoid bobbin, engine oil filter, fuel tank, ignition equipment case, vehicle speed sensor, cable liner, other automobile/vehicle parts, and other various uses.

Said PAS films have good mechanical characteristics, electric characteristics, and heat resistance, and can serve effectively for various uses including dielectric film (for film capacitor and chip capacitor), circuit base plate, insulation base plate, motor insulation film, transformer insulation film, and mold release film.

Monofilaments and short fibers of said PASs can serve effectively for various uses including paper machine drier canvas, net conveyer, bag filter, and insulation paper.

EXAMPLES

The invention is illustrated more specifically below by using examples. These examples are given only for showing typical embodiments and they are not intended to place any limitations on the invention.

<Molecular Weight Measurement>

The molecular weight of polyarylene sulfides and polyarylene sulfide prepolymers is determined in terms of polystyrene by gel permeation chromatography (GPC), which is one of the size exclusion chromatography (SEC) methods. The GPC measurement conditions are listed below.

Equipment: SSC-7100 manufactured by Senshu Scientific Co., Ltd.
Column: GPC3506 manufactured by Senshu Scientific Co., Ltd.
Eluant: 1-chloronaphthalene
Detector: differential refractometer
Column temperature: 210° C.
Pre-thermostat bath temperature: 250° C.
Pump thermostat bath temperature: 50° C.
Detector temperature: 210° C.
Flow rate: 1.0 mL/min
Specimen injection rate: 300 μL (slurry: about 0.2 wt %)

<Cyclic Polyphenylene Sulfide Formation Rate Measurement>

The formation rate of a cyclic polyphenylene sulfide compound is determined from qualitative and quantitative analysis by HPLC. The HPLC measurement conditions are listed below.

Equipment: LC-10Avp Series manufactured by Shimadzu Corporation
Column: Mightysil RP-18 GP150-4.6 (5 μm)
Detector: photodiode array detector (UV=270 nm)

Reference Example 1

The following example shows production of a linear PAS based on prior art. Specifically, a sulfidizing agent was allowed to come in contact with a dihalogenated aromatic compound in an organic polar solvent to produce a linear PAS. First, 116.9 g (1.00 mole) of a 48 wt % aqueous solution of sodium hydrosulfide, 43.8 g (1.05 moles) of 96% sodium hydroxide, 198.3 g (2.00 moles) of N-methyl-2-pyrrolidone (NMP), 8.2 g (0.10 moles) of sodium acetate, and 150 g of ion-exchanged water were put in a stainless steel autoclave with a stirrer. Then, a fractionating column was installed on the autoclave, and stirring at 240 rpm was started, followed by gradual heating for about 3 hours up to 235° C. under atmospheric pressure while supplying nitrogen. During this operation, 212 g was distilled out of the fractionating column. And, 0.012 moles of hydrogen sulfide was lost. Gas chromatography analysis of the distillate showed that it was a liquid mixture 209 g of water and 3.5 g of NMP, and that the amount of water and NMP in the reaction system was 2.3 g and 194.8 g, respectively.

After the distillation, the reaction container was cooled to about 160° C., 148.5 g (1.01 moles) of p-dichlorobenzene (p-DCB) and 99.1 g (1.00 mole) of NMP were added, and the reaction container was sealed in a nitrogen gas atmosphere. While stirring at 400 rpm, it was heated for about 30 min up to 200° C., and further heated from 200° C. to 270° C. at a rate of 0.6° C./min, followed by maintaining the reaction at 270° C. for 140 min. Subsequently, 36 g (2.00 moles) of water was poured into the reaction system while cooling it for 15 min down to 250° C., followed by cooling it from 250° C. to 220° C. at a rate of 0.4° C./min. Then it was quenched to about room temperature.

The contents were taken out and diluted with 500 g of NMP to produce slurry, which was then stirred at 85° C. for about 30 min, followed by filtering the slurry through a 80 mesh stainless steel filter to recover solid material. To the resulting solid material, 400 g of NMP was added and stirred at 85° C. for about 30 min, filtering it in the same way as above to recover solid material. Subsequently, the operation of stirring in 800 g of warm water, washing, and filtering was repeated 5 times to produce particulate solid material. This was dried in hot air at 60° C., and then dried at 120° C. under reduced pressure to produce about 90 g of dry solid material.

Analysis of the solid material thus produced was carried out. Absorption spectra obtained by infrared spectroscopy analysis (equipment: FTIR-8100A manufactured by Shimadzu Corporation) showed that the material was linear polyphenylene sulfide. Its weight average molecular weight was 38,600. The polyphenylene sulfide prepared here is hereinafter referred as linear PPS-1.

Reference Example 2

In the example given below, a sulfidizing agent and a dihalogenated aromatic compound in an organic polar solvent whose amount is 1.25 liters or more per mole of the sulfur component of the sulfidizing agent are heated to cause reaction to prepare a PAS mixture consisting of a cyclic PAS and a linear PAS, followed by removing the cyclic PAS to obtain a linear PAS with a smaller molecular weight than in the case of Reference example 1.

First, 14.03 g (0.120 moles) of 48 wt % aqueous solution of sodium hydrosulfide, 12.50 g (0.144 moles) of 48 wt % aqueous solution prepared from 96% sodium hydroxide, 615.0 g (6.20 moles) of NMP, and p-DCB was put in a stainless steel autoclave with a stirrer. After sufficiently filling the reaction container with nitrogen, it was sealed in a nitrogen gas atmosphere.

While stirring at 400 rpm, it was heated for about 1 hour to raise the temperature from room temperature to 200° C. At this stage, the pressure in the reaction container was 0.35 MPa in terms of gauge pressure. Then it was heated for about 30 min to raise the temperature from 200° C. to 270° C. At this stage, the pressure in the reaction container was 1.05 MPa in terms of gauge pressure. After maintaining the temperature at 270° C. for 1 hour, the material was recovered while quenching the container to about room temperature.

The material obtained was analyzed by gas chromatography and high speed liquid chromatography, and results showed that the p-DCB monomer consumption rate was 93%, and the cyclic PPS formation rate was 18.5% assuming that the sulfur component in the reaction mixture had been completely converted into a cyclic PPS.

A 500 g portion of the resulting material was diluted with about 1,500 g of ion-exchanged water, and then filtered through a glass filter with an average aperture of 10 to 16 micrometers. The material remaining on the filter was dispersed in about 300 g of ion-exchanged water, stirred at 70° C. for 30 min, followed by repeating the same filtering operation as above three times to prepare white solid material. This was vacuum-dried overnight at 80° C. to provide dry solid material.

The resulting solid material was put in a filter paper thimble and subjected to Soxhlet extraction for about 5 hours using chloroform as solvent to remove the low molecular weight components from the solid material.

After the extraction operation, the solid material remaining in the filter paper thimble was dried overnight at 70° C. under reduced pressure to produce about 6.98 g of off-white solid material. It was subjected to analysis, and absorption spectra of infrared spectroscopy analysis showed that it was a linear polyphenylene sulfide with a weight average molecular weight of 6,300. The polyphenylene sulfide prepared here is hereinafter referred to as linear PPS-2.

Reference Example 3

After removing the solvent from the extract resulting from the chloroform extraction operation in Reference example 2, about 5 g of chloroform was added to prepare slurry, which was drop to about 300 g of methanol while stirring. The resulting deposits were recovered by filtration, and vacuum-dried at 70° C. for 5 hours to produce 1.19 g of white powder. Absorption spectra of infrared spectroscopy analysis showed that this white powder was a compound comprising phenylene sulfide units. Furthermore, mass spectrum analysis (equipment: M-1200H manufactured by Hitachi, Ltd.) of components separated by high speed liquid chromatography, along with molecular weight measurements by MALDI-TOF-MS, showed that the white powder is a mixture consisting mainly of cyclic polyphenylene sulfide molecules with a number of repeating units of 4 to 12 and that the weight fraction of the cyclic polyphenylene sulfide was about 90%.

The yield of the white powder was 20.8% assuming that the sulfur component existing in the reaction system during reaction was converted completely into the PPS component.

Example 1

A 6.49 g portion of the linear PPS-1 (containing 0.0601 mole sulfur component) obtained in Reference example 1, 0.711 g of 48 wt % aqueous solution of sodium hydrosulfide (sodium hydrosulfide 0.341 g (0.00608 mole), water 0.370 g (0.0205 mole)), 0.649 g of 48 wt % aqueous solution prepared from 96%-purity sodium hydroxide (sodium hydroxide 0.299 g (0.00748 mole), water 0.337 g (0.0187 mole)), 615 g (6.21 mole) of N-methyl-2-pyrrolidone (NMP), and 0.894 g (0.00608 mole) of p-dichlorobenzene (p-DCB) were put in a stainless steel autoclave with a stirrer. The total amount of sulfur components coming from the linear PPS-1 and sodium hydrosulfide was 0.0662 mole, and the amount of the solvent was about 9.07 L per mole of the sulfur components in the reaction mixture.

After sealing the reaction container in a nitrogen gas atmosphere at room temperature under atmospheric pressure, it was heated for about 1 hour from room temperature to 200° C. while stirring at 400 rpm. It was further heated for about 0.5 hour up to 270° C. At this stage, the pressure in the reaction system was 0.6 MPa in terms of gauge pressure. It was maintained at 270° C. for 1 hour and then quenched down to about room temperature.

The material obtained was analyzed by gas chromatography and high speed liquid chromatography, and results showed that the p-DCB monomer consumption rate was 58.1%, and the formation rate of the cyclic PAS relative to the feed monomer (p-DCB) was about 251%. It was also shown that the cyclic PAS formation rate was 23.1% assuming that the sulfur component in the reaction mixture had been completely converted into a cyclic PAS.

Thus, it is found that the cyclic PAS production process of an embodiment of the invention serves to complete the cyclic PAS formation reaction in a short period of time and produce a cyclic PAS in a larger quantity than the fed monomer. This suggests that part of the fed linear PPS is converted into the cyclic PAS during the reaction, indicating that the invention serves to produce the cyclic PAS with high efficiency.

Example 2

A 6.52 g portion of the linear PPS-1 (containing 0.0604 mole sulfur component) obtained in Reference example 1, 0.279 g (0.00608 mole) of anhydrous lithium sulfide, 0.0421 g (0.00176 mole) of lithium hydroxide, 616 g (6.22 mole) of NMP, and 0.894 g (0.00608 mole) of p-DCB were put in a stainless steel autoclave with a stirrer. The total amount of the sulfur components coming from the linear PPS-1 and lithium sulfide was 0.0665 mole, and the amount of the solvent was about 9.04 L per mole of the sulfur components in the reaction mixture.

After sealing the reaction container in a nitrogen gas atmosphere at room temperature under atmospheric pressure, it was heated for about 1 hour from room temperature to 200° C. while stirring at 400 rpm. It was further heated for about 0.5 hour up to 270° C. It was maintained at 270° C. for 1 hour and then quenched down to about room temperature.

The material obtained was analyzed by gas chromatography and high speed liquid chromatography, and results showed that the p-DCB monomer consumption rate was 29.5%, and the formation rate of the cyclic PAS relative to the feed monomer (p-DCB) was about 194%. It was also shown that the cyclic PAS formation rate was 17.8% assuming that the sulfur component in the reaction mixture had been completely converted into a cyclic PAS.

Thus, it is found that though the sulfidizing agent is different from that used in Example 1, the cyclic PAS formation reaction is completed in a short period of time and a cyclic PAS is produced in a larger quantity than the fed monomer. This suggests that part of the fed linear PPS is converted into the cyclic PAS during the reaction, indicating that the invention serves to produce the cyclic PAS with high efficiency. However, the formation rate is slightly lower than in Example 1 where sodium hydrosulfide, which is a preferable sulfidizing agent, is used.

Example 3

Described below are results of the production of a cyclic PAS at different feed ratios between the linear PAS and the monomer.

Except for the use of 5.18 g of the linear PPS-1 (sulfur component 0.0480 mole), 1.40 g of 48 wt % aqueous solution of sodium hydrosulfide (sodium hydrosulfide 0.673 g (0.0120 mole), water 0.730 g (0.0406 mole)), 1.30 g of 48 wt % aqueous solution prepared from 96%-purity sodium hydroxide (sodium hydroxide 0.600 g (0.0150 mole), water 0.677 g (0.0376 mole)), and 1.76 g (0.012 mole) of p-DCB, the same procedure as in Example 1 was carried out to produce a cyclic PAS.

The material obtained was analyzed by gas chromatography and high speed liquid chromatography, and results showed that the p-DCB monomer consumption rate was 81.8%, and the formation rate of the cyclic PAS relative to the feed monomer (p-DCB) was about 130%. It was also shown that the cyclic PAS formation rate was 25.9% assuming that the sulfur component in the reaction mixture had been completely converted into a cyclic PAS.

A 200 g portion of the resulting material was diluted with about 600 g of ion-exchanged water, and then filtered through a glass filter with an average aperture of 10 to 16 micrometers. The material remaining on the filter was dispersed in about 150 g of ion-exchanged water, stirred at 70° C. for 30 min, followed by repeating the same filtering operation as above three times to prepare white solid material. This was vacuum-dried overnight at 80° C. to provide dry solid material.

The resulting dry solid material was put in a filter paper thimble and subjected to Soxhlet extraction for about 5 hours using chloroform as solvent. After removing the solvent from the extract, about 5 g of chloroform was added to prepare slurry, which was dropped into about 500 g of methanol while stirring. The resulting deposits were recovered by filtration, and vacuum-dried at 70° C. for 5 hours to produce 0.65 g of white powder. Absorption spectra of infrared spectroscopy analysis showed that this white powder was a compound comprising phenylene sulfide units. Furthermore, mass spectrum analysis of components separated by high speed liquid chromatography, along with molecular weight measurements by MALDI-TOF-MS, showed that the white powder is a mixture consisting mainly of cyclic polyphenylene sulfide molecules with a number of repeating units of 4 to 12 and that the weight fraction of the cyclic polyphenylene sulfide was about 92%.

Thus, it is found that the cyclic PAS production process of an embodiment of the invention serves to complete the cyclic PAS formation reaction in a short period of time and produce a cyclic PAS in a larger quantity than the fed monomer, even if the feed ratio between the linear PAS and the monomer is changed.

Comparative Example 1

Described here are results of carrying out the operation using only the linear PAS and an organic polar solvent as feed materials and without using a sulfidizing agent and a dihalogenated aromatic compound.

Except that only 6.48 g of the linear PPS-1 (sulfur component 0.0600 mole) prepared in Reference example 1 and 615 g (6.21 mole) of NMP were used as feed material and put in a stainless steel autoclave with a stirrer, the same operation as in Example 1 was carried out. The total amount of the sulfur components coming from the linear PPS-1 was 0.0600 mole, and the amount of the solvent was about 10.0 L per mole of the sulfur components in the reaction mixture.

A 200 g portion of the resulting material was taken, and subjected to the same procedure as in Example 3 to recover the cyclic PPS. However, what was recovered was only about 0.01 g of white powder containing the cyclic PPS, indicating that the reaction had hardly proceeded.

As clearly seen from the comparison between Comparative example 1 and Examples 1 to 3, the cyclic PAS is hardly obtained if a sulfidizing agent and dihalogenated aromatic compound are not used as feed materials.

Comparative Example 2

Described here are results of carrying out the operation using only the linear PAS, an organic polar solvent and an organic polar solvent as feed materials and without using a dihalogenated aromatic compound.

Except that p-DCB was not used as feed material, the same procedures as in Example 3 was carried out. The material obtained from the reaction was analyzed by high speed liquid chromatography, and results showed that the cyclic PAS formation rate was 3.07% assuming that the sulfur components in the reaction mixture had been completely converted into the cyclic PAS. It was also found from the high speed liquid chromatography analysis that the main component of the product was not a cyclic PPS. Mass analysis data showed that the component was a linear oligomer.

As clearly seen from the comparison between Comparative example 2 and Examples 1 to 3, the cyclic PAS is hardly obtained if a dihalogenated aromatic compound is not used as feed material.

Example 4

Described here are results of the production of a cyclic PAS using different linear PASs as feed material.

Except that 6.48 g (0.0600 mole) of the linear PPS-2 produced in Reference example 2 was fed as the linear PAS, the same procedure as in Example 1 was carried out to produce a cyclic PAS.

The material obtained was analyzed by gas chromatography and high speed liquid chromatography, and results showed that the p-DCB monomer consumption rate was 66.4%, and the formation rate of the cyclic PAS relative to the feed monomer (p-DCB) was about 234%. It was also shown that the cyclic PAS formation rate was 21.6% assuming that the sulfur component in the reaction mixture had been completely converted into a cyclic PAS.

Then, a 200 g portion of the resulting material was taken, and subjected to the same procedure as in Example 3 to recover the cyclic PPS. As a result, 0.67 g of 90%-purity white powder of the cyclic PPS was obtained.

It is found that, when using the cyclic PAS production process of an embodiment of the invention, in the case where a sulfidizing agent and a dihalogenated aromatic compound in an organic polar solvent whose amount is 1.25 liters or more per mole of the sulfur component of the sulfidizing agent are heated to cause reaction to prepare a PAS mixture consisting of a cyclic PAS and a linear PAS, followed by removing the cyclic PAS to separate out the linear PAS, the use of the resulting linear PAS also serves to perform quick reaction for cyclic PAS formation and produce the cyclic PAS in a larger quantity than the monomer used as feed material.

Example 5

Described here are results of the production of a cyclic PAS using a smaller amount of feed materials than in Example 1.

A 3.25 g portion of the linear PPS-1 (containing 0.0301 mole sulfur component) obtained in Reference example 1, 0.351 g of 48 wt % aqueous solution of sodium hydrosulfide (sodium hydrosulfide 0.168 g (0.00300 mole), water 0.183 g (0.0102 mole)), 0.313 g of 48 wt % aqueous solution prepared from 96%-purity sodium hydroxide (sodium hydroxide 0.144 g (0.00360 mole), water 0.169 g (0.00938 mole)), 615 g (6.21 mole) of N-methyl-2-pyrrolidone (NMP), and 0.453 g (0.00308 mole) of p-dichlorobenzene (p-DCB) were put in a stainless steel autoclave with a stirrer. The total amount of sulfur components coming from the linear PPS-1 and sodium hydrosulfide was 0.0331 mole, and the amount of the solvent was about 18.2 L per mole of the sulfur components in the reaction mixture.

After sealing the reaction container in a nitrogen gas atmosphere at room temperature under atmospheric pressure, it was heated for about 1 hour from room temperature to 200° C. while stirring at 400 rpm. It was further heated for about 0.5 hour up to 270° C. It was maintained at 270° C. for 2 hours and then quenched down to about room temperature.

The material obtained was analyzed by gas chromatography and high speed liquid chromatography, and results showed that the p-DCB monomer consumption rate was 55.8%, and the formation rate of the cyclic PAS relative to the feed monomer (p-DCB) was about 309%. It was also shown that the cyclic PAS formation rate was 28.8% assuming that the sulfur component in the reaction mixture had been completely converted into a cyclic PAS.

It is found that the yield of the cyclic PAS can be increased by decreasing the initial amounts of the feed materials.

Example 6

Described here are results of carrying out operations for the production of a cyclic PAS using larger amounts of feed materials than in Example 1.

A 13.0 g portion of the linear PPS-1 (containing 0.120 mole sulfur component) obtained in Reference example 1, 1.43 g of 48 wt % aqueous solution of sodium hydrosulfide (sodium hydrosulfide 0.687 g (0.0122 mole), water 0.713 g (0.0396 mole)), 1.26 g of 48 wt % aqueous solution prepared from 96%-purity sodium hydroxide (sodium hydroxide 0.582 g (0.0146 mole), water 0.657 g (0.0365 mole)), 572 g (5.77 mole) of NMP, and 1.78 g (0.0121 mole) of p-DCB were put in a stainless steel autoclave with a stirrer. The total amount of sulfur components coming from the linear PPS-1 and sodium hydrosulfide was 0.132 mole, and the amount of the solvent was about 4.22 L per mole of the sulfur components in the reaction mixture.

After sealing the reaction container in a nitrogen gas atmosphere at room temperature under atmospheric pressure, it was heated for about 1 hour from room temperature to 200° C. while stirring at 400 rpm. It was further heated for about 0.5 hour up to 270° C. It was maintained at 270° C. for 1 hour and then quenched down to about room temperature.

The material obtained was analyzed by gas chromatography and high speed liquid chromatography, and results showed that the p-DCB monomer consumption rate was 59.2%, and the formation rate of the cyclic PAS relative to the feed monomer (p-DCB) was about 132%. It was also shown that the cyclic PAS formation rate was 12.1% assuming that the sulfur component in the reaction mixture had been completely converted into a cyclic PAS.

Thus, it is found that a cyclic PAS can be produced with high yield even if large amounts of feed materials are used.

Example 7

Described here are results of the production of a cyclic PAS using larger amounts of feed materials than in Example 1 and using the linear PPS-2 produced in Reference example 2 as the feed linear PAS material.

A 10.4 g portion of the linear PPS-2 (containing 0.0960 mole sulfur component) obtained in Reference example 2, 2.81 g of 48 wt % aqueous solution of sodium hydrosulfide (sodium hydrosulfide 1.35 g (0.0240 mole), water 1.46 g (0.0811 mole)), 2.57 g of 48 wt % aqueous solution prepared from 96%-purity sodium hydroxide (sodium hydroxide 1.19 g (0.0297 mole), water 1.33 g (0.0739 mole)), 617 g (6.22 mole) of NMP, and 3.53 g (0.0240 mole) of p-DCB were put in a stainless steel autoclave with a stirrer. The total amount of sulfur components coming from the linear PPS-1 and sodium hydrosulfide was 0.120 mole, and the amount of the solvent was about 5.02 L per mole of the sulfur components in the reaction mixture.

After sealing the reaction container in a nitrogen gas atmosphere at room temperature under atmospheric pressure, it was heated for about 1 hour from room temperature to 200° C. while stirring at 400 rpm. It was further heated for about 0.5 hour up to 270° C. It was maintained at 270° C. for 1 hour and then quenched down to about room temperature.

The material obtained was analyzed by gas chromatography and high speed liquid chromatography, and results showed that the p-DCB monomer consumption rate was 86.6%, and the formation rate of the cyclic PAS relative to the feed monomer (p-DCB) was about 98%. It was also shown that the cyclic PAS formation rate was 19.7% assuming that the sulfur component in the reaction mixture had been completely converted into a cyclic PAS.

Then, a 200 g portion of the resulting reaction product was taken, and subjected to the same procedure as in Example 3 to recover the cyclic PPS. As a result, 1.08 g of 86%-purity white powder of the cyclic PPS was obtained.

Thus, it is found that a cyclic PAS can be produced with high yield even if large amounts of feed materials are used and that the cyclic PAS can be produced efficiently in terms of the yield per unit amount of the reaction product.

Example 8

Described here are results of the production of a cyclic PAS carried out using still larger amounts of feed materials than in Example 6.

A 20.7 g portion of the linear PPS-1 (containing 0.192 mole sulfur component) obtained in Reference example 1, 5.61 g of 48 wt % aqueous solution of sodium hydrosulfide (sodium hydrosulfide 2.69 g (0.0480 mole), water 2.92 g (0.162 mole)), 5.22 g of 48 wt % aqueous solution prepared from 96%-purity sodium hydroxide (sodium hydroxide 2.40 g (0.0601 mole), water 2.71 g (0.151 mole)), 615 g (6.21 mole) of NMP, and 7.06 g (0.0480 mole) of p-DCB were put in a stainless steel autoclave with a stirrer. The total amount of sulfur components coming from the linear PPS-1 and sodium hydrosulfide was 0.24 mole, and the amount of the solvent was about 2.50 L per mole of the sulfur components in the reaction mixture.

After sealing the reaction container in a nitrogen gas atmosphere at room temperature under atmospheric pressure, it was heated for about 1 hour from room temperature to 200° C. while stirring at 400 rpm. It was further heated for about 0.5 hour up to 270° C. It was maintained at 270° C. for 1 hour and then quenched down to about room temperature.

The material obtained was analyzed by gas chromatography and high speed liquid chromatography, and results showed that the p-DCB monomer consumption rate was 87.2%, and the formation rate of the cyclic PAS relative to the feed monomer (p-DCB) was about 55.8%. It was also shown that the cyclic PAS formation rate was 11.2% assuming that the sulfur component in the reaction mixture had been completely converted into a cyclic PAS.

Then, a 200 g portion of the resulting reaction product was taken, and subjected to the same procedure as in Example 3 to recover the cyclic PPS. As a result, 1.12 g of 86%-purity white powder of the cyclic PPS was obtained.

Thus, it is found that a cyclic PAS can be produced with high yield even if large amounts of feed materials are used and that the cyclic PAS can be produced efficiently in terms of the yield per unit amount of the reaction product.

Example 9

Described here are results of the production of a cyclic PAS carried out using still larger amounts of feed materials than in Example 8.

A 36.3 g portion of the linear PPS-1 (containing 0.336 mole sulfur component) obtained in Reference example 1, 9.82 g of 48 wt % aqueous solution of sodium hydrosulfide (sodium hydrosulfide 4.71 g (0.0840 mole), water 5.11 g (0.284 mole)), 8.02 g of 48 wt % aqueous solution prepared from 96%-purity sodium hydroxide (sodium hydroxide 3.70 g (0.0924 mole), water 4.17 g (0.232 mole)), 615 g (6.21 mole) of NMP, and 12.3 g (0.0840 mole) of p-DCB were put in a stainless steel autoclave with a stirrer. The total amount of sulfur components coming from the linear PPS-1 and sodium hydrosulfide was 0.42 mole, and the amount of the solvent was about 1.43 L per mole of the sulfur components in the reaction mixture.

After sealing the reaction container in a nitrogen gas atmosphere at room temperature under atmospheric pressure, it was heated for about 1 hour from room temperature to 200° C. while stirring at 400 rpm. It was further heated for about 0.5 hour up to 270° C. It was maintained at 270° C. for 1 hour and then quenched down to about room temperature.

The material obtained was analyzed by gas chromatography and high speed liquid chromatography, and results showed that the p-DCB monomer consumption rate was 82.3%, and the formation rate of the cyclic PAS relative to the feed monomer (p-DCB) was about 26.2%. It was also shown that the cyclic PAS formation rate was 5.23% assuming that the sulfur component in the reaction mixture had been completely converted into a cyclic PAS.

Then, a 200 g portion of the resulting reaction product was taken, and subjected to the same procedure as in Example 3 to recover the cyclic PPS. As a result, 0.91 g of 83%-purity white powder of the cyclic PPS was obtained.

Thus, it is found that a cyclic PAS can be produced with high yield even if large amounts of feed materials, but also that the cyclic PAS can be produced slightly less efficiently in terms of purity as well as the yield per unit amount of the reaction product as compared with the products obtained under the preferable feed material conditions of an embodiment of the invention.

Example 10

Except that heating the feed materials from 200° C. to only 250° C., maintain the temperature at 250° C. for 1 hour, followed by quenching down to about room temperature to provide a reaction product, the same procedures as in Example 8 was carried out.

The material obtained was analyzed by gas chromatography and high speed liquid chromatography, and results showed that the p-DCB monomer consumption rate was 87.4%, and the formation rate of the cyclic PAS relative to the feed monomer (p-DCB) was about 52.5%. It was also shown that the cyclic PAS formation rate was 10.8% assuming that the sulfur component in the reaction mixture had been completely converted into a cyclic PAS.

Then, a 600 g portion of the resulting reaction product was taken, and subjected to the same procedure as in Example 3 to recover the cyclic PPS. As a result, 2.8 g of 96%-purity white powder of the cyclic PPS was obtained. Furthermore, after the extraction operation for this cyclic PPS recovery, the solid material remaining in the filter paper thimble was dried overnight at 70° C. under reduced pressure to produce about 20 g of off-white solid material. It was subjected to analysis, and absorption spectra of infrared spectroscopy analysis showed that it was a linear PPS.

It is found that as compared with Example 8, the cyclic PAS can be produced at high yield even if the reaction temperature is lowered and that a cyclic PPS with very high purity can be obtained though the cyclic PPS production efficiency is slightly lower in terms of the yield per unit amount of the reaction product.

Example 11

Described here are results of the production of a cyclic PAS carried out using the linear PPS produced in Example 10 as feed material.

A 19.4 g portion of the linear PPS (containing 0.180 mole sulfur component) obtained in Example 10, 5.26 g of 48 wt % aqueous solution of sodium hydrosulfide (sodium hydrosulfide 2.53 g (0.0450 mole), water 2.74 g (0.152 mole)), 4.88 g of 48 wt % aqueous solution prepared from 96%-purity sodium hydroxide (sodium hydroxide 2.25 g (0.0563 mole), water 2.54 g (0.141 mole)), 577 g (5.82 mole) of NMP, and 6.62 g (0.0450 mole) of p-DCB were put in a stainless steel autoclave with a stirrer. The total amount of sulfur components coming from the linear PPS and sodium hydrosulfide used as feed materials was 0.225 mole, and the amount of the solvent was about 2.50 L per mole of the sulfur components in the reaction mixture.

After preparing the initial mixture, the same operation as in Example 10 was carried out. The material obtained was analyzed by gas chromatography and high speed liquid chromatography, and results showed that the p-DCB monomer consumption rate was 81.1%, and the formation rate of the cyclic PAS relative to the feed monomer (p-DCB) was about 64.5%. It was also shown that the cyclic PAS formation rate was 12.9% assuming that the sulfur component in the reaction mixture had been completely converted into a cyclic PAS.

Then, a 200 g portion of the resulting reaction product was taken, and subjected to the same procedure as in Example 3 to recover the cyclic PPS. As a result, 1.02 g of 97%-purity white powder of the cyclic PPS was obtained.

From Example 11, it is found that a high-purity cyclic PAS can be produced with high yield even if a reaction mixture consisting of a linear PAS, sulfidizing agent, dihalogenated aromatic compound, and organic polar solvent is heated to cause reaction to prepare a PAS mixture containing a cyclic PAS and a linear PAS, followed by removing the cyclic PAS to separate out the linear PAS, which is then used as feed material, i.e., the linear PAS (a).

Comparative Example 3

Described here are results of using a concentrated reaction mixture in a higher concentration range than preferred in the invention. Specifically, the amount of the organic polar solvent fed was less than 1.25 liters per mole of the sulfur components in the reaction mixture.

A 43.2 g portion of the linear PPS-1 (containing 0.400 mole sulfur component) obtained in Reference example 1, 11.7 g of 48 wt % aqueous solution of sodium hydrosulfide (sodium hydrosulfide 5.61 g (0.100 mole), water 6.08 g (0.338 mole)), 10.4 g of 48 wt % aqueous solution prepared from 96%-purity sodium hydroxide (sodium hydroxide 4.800 g (0.120 mole), water 5.42 g (0.301 mole)), 496 g (5.00 mole) of NMP, and 14.7 g (0.100 mole) of p-DCB were put in a stainless steel autoclave with a stirrer. The total amount of sulfur components coming from the linear PPS-1 and sodium hydrosulfide was 0.50 mole, and the amount of the solvent was about 0.97 L per mole of the sulfur components in the reaction mixture.

After sealing the reaction container in a nitrogen gas atmosphere at room temperature under atmospheric pressure, it was heated for about 1 hour from room temperature to 200° C. while stirring at 400 rpm. It was further heated for about 0.5 hour up to 270° C. It was maintained at 270° C. for 1 hour and then quenched down to about room temperature.

The material obtained was analyzed by gas chromatography and high speed liquid chromatography, and results showed that the p-DCB monomer consumption rate was 75.5%, and the formation rate of the cyclic PAS relative to the feed monomer (p-DCB) was about 13.6%. It was also shown that the cyclic PAS formation rate was 2.72% assuming that the sulfur component in the reaction mixture had been completely converted into a cyclic PAS.

Thus, it is found that a cyclic PAS can hardly be obtained and a polymer (linear PPS) accounts for a very large part of the product if the reaction mixture of the feed materials is in a higher concentration range preferred for the invention.

The invention provides a process to produce a cyclic polyarylene sulfide economically, simply, quickly and efficiently. Cyclic polyarylene sulfide has high industrial value because it serves as material for producing a linear polyarylene sulfide with a high degree of polymerization.

The invention claimed is:

1. A process for producing a cyclic polyarylene sulfide comprising heating a reaction mixture containing at least
   (a) a linear polyarylene sulfide,
   (b) a sulfidizing agent,
   (c) a dihalogenated aromatic compound, and
   (d) an organic polar solvent,
   to cause a reaction to produce a cyclic polyarylene sulfide wherein the amount of the organic polar solvent is 1.25 liters or more per mole of sulfur in the reaction mixture, wherein the weight average molecular weight of the linear polyarylene sulfide (a) is 1,000 or more and (a) is a starting material at the start of the reaction when the degree of conversion of the dihalogenated aromatic compound fed in the reaction system is zero.

2. A process for producing a cyclic polyarylene sulfide as claimed in claim 1 wherein the heating temperature is above a reflux temperature of the reaction mixture under atmospheric pressure.

3. A process for producing a cyclic polyarylene sulfide as claimed in claim 1 wherein the amount of the organic polar solvent used is 50 liters or less per mole of sulfur in the reaction mixture.

4. A process for producing a cyclic polyarylene sulfide as claimed in claim 1 wherein the pressure applied during the heating of the reaction mixture is 0.05 MPa or more in terms of gauge pressure.

5. A process for producing a cyclic polyarylene sulfide as claimed in claim 1 wherein the dihalogenated aromatic compound (c) is dichlorobenzene.

6. A process for producing a cyclic polyarylene sulfide as claimed in claim 1 wherein the sulfidizing agent (b) is an alkali metal sulfide.

7. A process for producing a cyclic polyarylene sulfide as claimed in claim 1 wherein the linear polyarylene sulfide (a) is prepared by allowing a sulfidizing agent to come in contact with a dihalogenated aromatic compound in an organic polar solvent.

8. A process for producing a cyclic polyarylene sulfide as claimed in claim 1 wherein the weight average molecular weight of the linear polyarylene sulfide (a) is 2,500 or more.

9. A process for producing a cyclic polyarylene sulfide comprising:
   combining (a) a linear polyarylene sulfide, (b) a sulfidizing agent, and (c) a dihalogenated aromatic compound to form a starting mixture; and
   heating the starting mixture in the presence of (d) an organic polar solvent to cause a reaction to produce a cyclic polyarylene sulfide wherein the amount of the organic polar solvent is 1.25 liters or more per mole of sulfur in the reaction mixture,
   wherein the weight average molecular weight of the linear polyarylene sulfide (a) is 1,000 or more and (a) is a starting material at the start of the reaction when the degree of conversion of the dihalogenated aromatic compound fed in the reaction system is zero.

* * * * *